United States Patent
Kinjo et al.

(10) Patent No.: US 6,852,033 B2
(45) Date of Patent: Feb. 8, 2005

(54) GAME DEVICE

(75) Inventors: Naoto Kinjo, Kanagawa (JP); Kiichirou Sakamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/212,871

(22) Filed: Aug. 7, 2002

(65) Prior Publication Data

US 2003/0069069 A1 Apr. 10, 2003

(30) Foreign Application Priority Data

Sep. 28, 2001 (JP) ........................................ 2001-303525

(51) Int. Cl.⁷ ........................... A63F 13/00; A63F 9/24; G06F 17/00; G06F 19/00
(52) U.S. Cl. ............................. 463/30; 463/31; 463/32; 463/33; 463/34
(58) Field of Search .................. 340/323 R; 463/1–46; 273/148 B, 856; 364/410

(56) References Cited

U.S. PATENT DOCUMENTS 4,710,873 A * 12/1987 Breslow et al. ............... 463/31
6,320,495 B1 * 11/2001 Sporgis ................... 340/323 R
6,435,969 B1 * 8/2002 Tanaka et al. ................. 463/44
6,554,705 B1 * 4/2003 Cumbers ...................... 463/29

FOREIGN PATENT DOCUMENTS

| JP | 11-57210 | * 3/1999 |
| JP | 11-502950 | * 3/1999 |
| JP | 2000-126443 | * 5/2000 |

* cited by examiner

Primary Examiner—John M. Hotaling, II
Assistant Examiner—Robert Mendoza
(74) Attorney, Agent, or Firm—Sughrue Mion, PLLC

(57) ABSTRACT

A game device includes a photographing unit, which photographs a user when the user uses a game provided by the game device, and a printer. A commemorative image is generated at a timing (e.g., each time a stage in the game is cleared or when the game is terminated) set on a setting screen, by making a composite of an image representing either user achievements or a game screen with an image of the user photographed by the photographing unit. The commemorative image is then displayed on a LCD of the game device. The commemorative image can be printed by the printer to make a commemorative image card when the user instructs the printer to print.

29 Claims, 14 Drawing Sheets

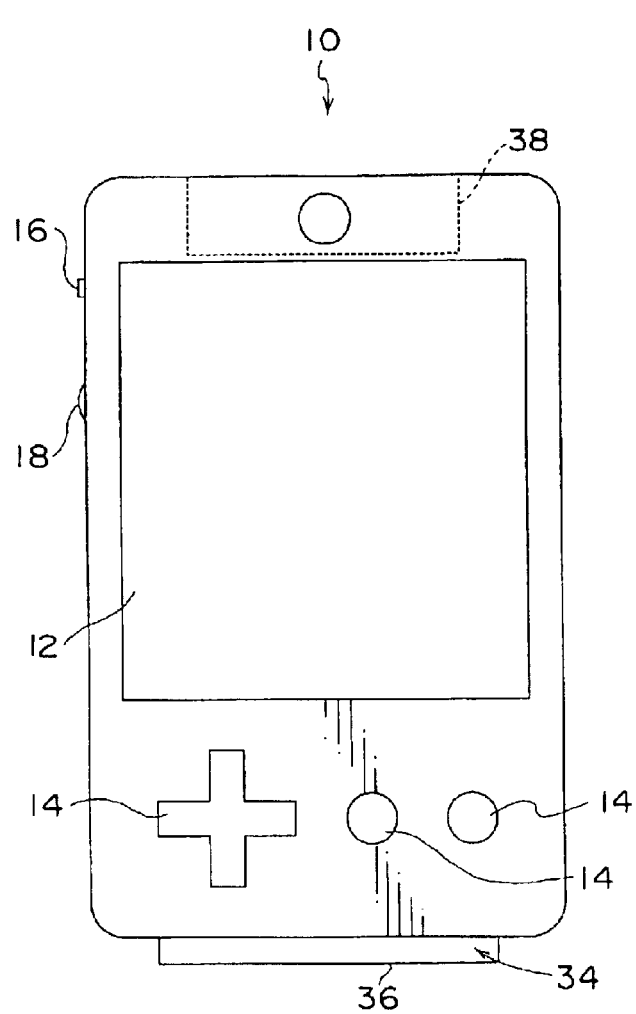

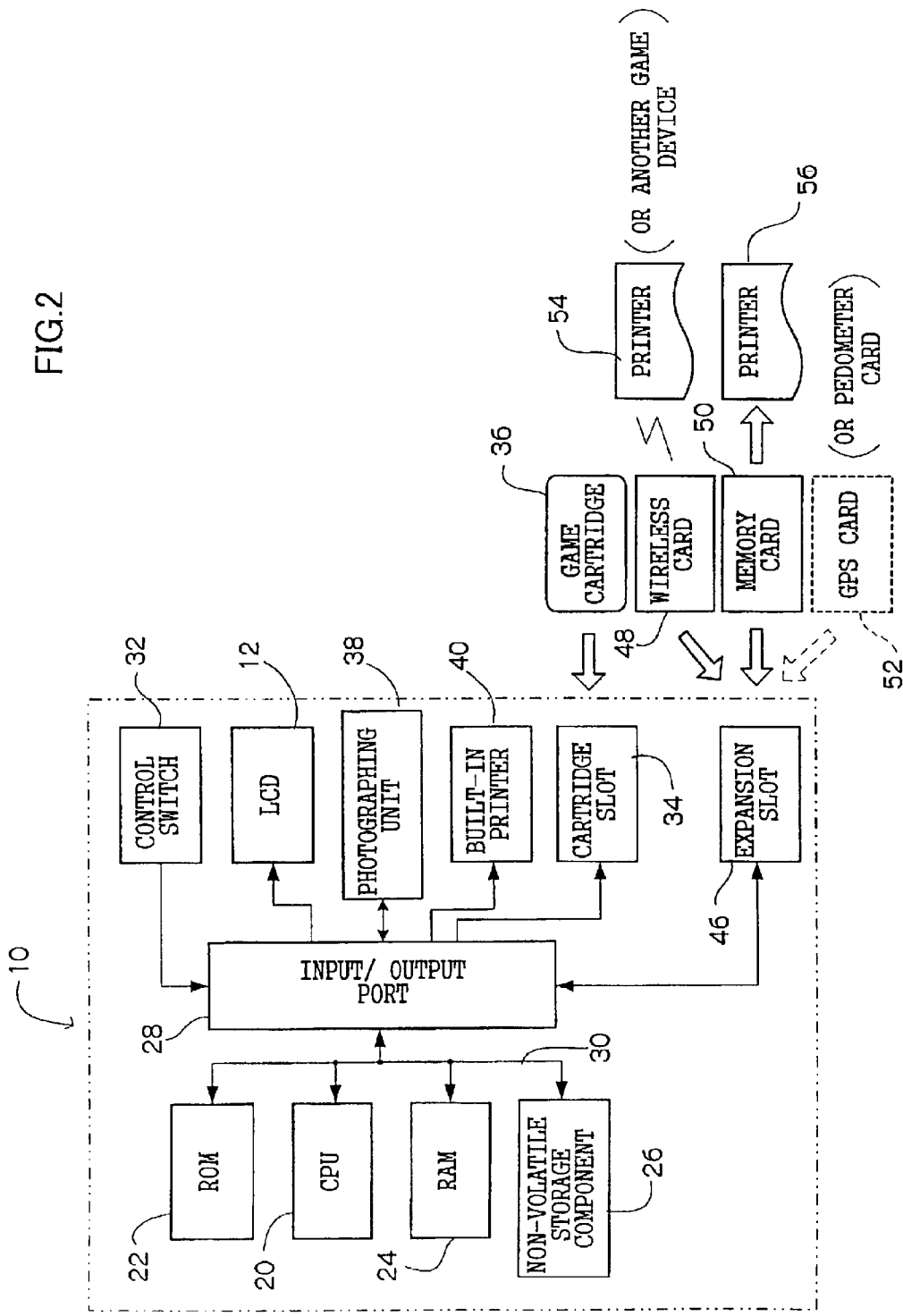

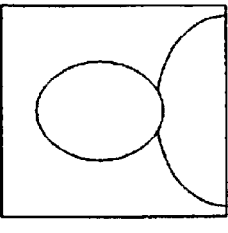

FIG.3A

```
COMMEMORATIVE IMAGE
GENERATION SETTING
GENERATION TIMING        ―
1. EACH TIME A STAGE IS
   CLEARED
2. ONLY WHEN GAME IS
   TERMINATED
USER IMAGE               ―
1. PHOTOGRAPH EACH TIME
2. USE ALREADY-
   PHOTOGRAPHED IMAGE
COMPOSITE IMAGE          ―
1. ACHIEVEMENTS
2. GAME SCREEN
COMMEMORATIVE
IMAGE DISPLAY PERIOD
1. IMMEDIATELY
2. AFTER TERMINATION
   OF GAME
```

FIG.3B

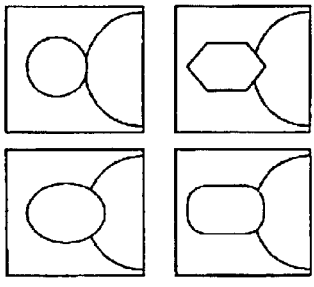

PLEASE SELECT IMAGE
TO BE USED IN
COMMEMORATIVE IMAGE

FIG.3C

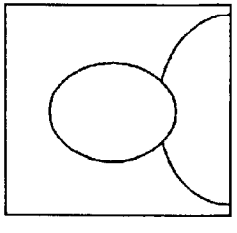

GAME NAME XXX
nTH STAGE CLEARED

SCORE OOOO
TIME  △△:△△

PRINT OUT? Y/N
EDIT?      Y/N

FIG.3D

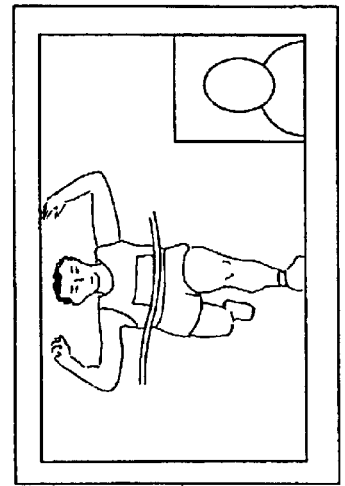

YOU ARE AN UNREGISTERED
NEW USER.
PLEASE INPUT
YOUR USER NAME AFTER
CONFIRMING THE IMAGE.

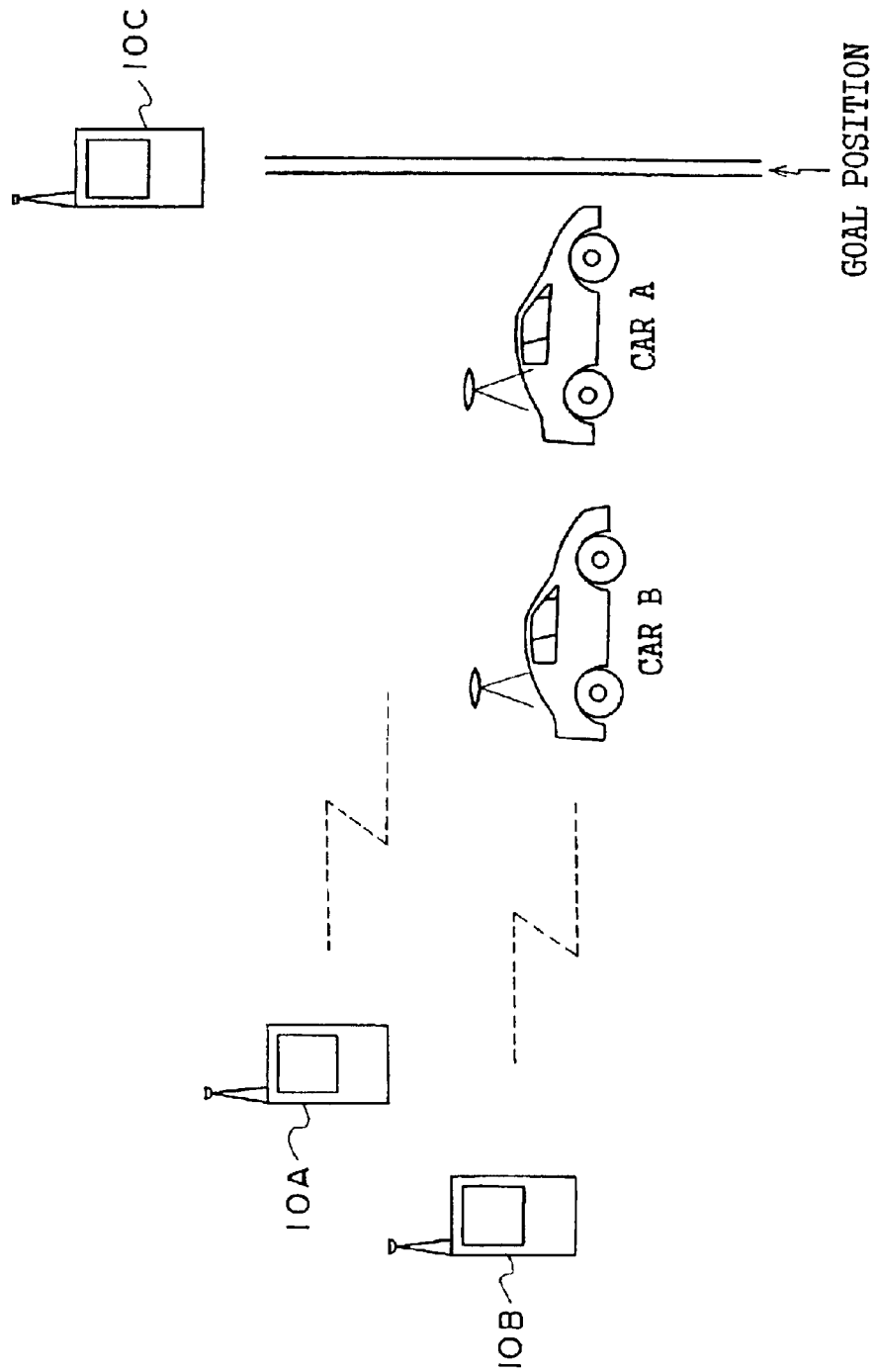

GAME DEVICE

BACKGROUND OF THE INVENTION

1. Field of the Invention

The present invention relates to a game device, and, more particularly, to a game device including a game-providing component for providing a game to a user.

2. Description of the Related Art

Portable game devices have a feature in that a particular game may be enjoyed without restrictions on the place and time in which the game device is operated, and have rapidly become widespread in recent years, particularly among children. Improving the entertaining performance of such game devices has been an important challenge. In recent years, devices disposed with, for example, color display components, functions for communicating with other game devices, and small and thin memory cards as media for storing programs (Japanese Patent Application Laid-Open (JP-A) No. 11-57210) have appeared. However, the demand for further improvement in the entertaining performance of such game devices continues.

Recently, there have been proposals to install photographing components into various types of electronic devices, such as personal computers, and installing such photographing components in game devices has been considered in order to improve the entertaining performance of the game devices. For example, JP-A No. 2000-126443 discloses installing a photographing component in a device that is used for a single, specific game known as a fighting card game and delivers fighting cards based on the results of the game. However, there have been no proposals, in this or in other publications, with respect to specific ways to improve entertaining performance by installing a photographing component in game devices capable of providing games other than such fighting card games.

SUMMARY OF THE INVENTION

The present invention has been made considering the above circumstances. It is an object of the invention to provide a game device in which improvement in entertaining performance can be realized.

In order to achieve the above-described object, a first aspect of the invention provides a game device comprising: a photographing component for photographing a user of a game which a game-providing component provides; and a commemorative image generation component by which the photographing component photographs the user, at the same time, a progress state or achievements of the game by the user is detected, a commemorative image in which an image of the user, which has been photographed with the photographing component, is synthesized on an image representing the progress state or the achievements of the game by the user is generated, and the commemorative image is output through an output component.

According to the first aspect, a game is provided to a user by the game-providing component. Here, the game-providing component may adopt a configuration in which there are provided, for example, a display component by which an arbitrary image can be displayed; an operation component which a user can operate; a voice output component which outputs voice, and the like, and the display component is configured to display a game screen, and predetermined voice is configured to be output through the voice output component, according to a program for game which has been previously stored in a storage component (the storage component may be installed in the game device, or may be removable from the game device), and, at the same time, the game screen and the output voice are changed according to the operation of the user through the operation component. But, the configuration is not limited to the above one, and a known configuration that can provide arbitrary games may be adopted.

And, according to the first aspect, the photographing component which can photograph the user to whom the game-providing component provides a game is provided. The photographing component may have a configuration comprising for example, a photographing element such as a CCD sensor, and an optical part in which an object is imaged on a receiving surface of the photographing element. The photographing component may be configured to make only a still image by photographing, but to produce a moving image through photographing, too. And, the first aspect game device comprises: the commemorative image generation component by which the photographing component photographs the user, at the same time, a progress state or achievements of the game by the user is detected, the commemorative image in which an image of the user, which has been photographed with the photographing component, is synthesized on an image representing the progress state or the achievements of the game by the user is generated, and the commemorative image is output through an output component.

The users of the game devices (especially, the users of the game devices of a portable type) are pitting their skills in games against each other, specifically, they are ordinarily are pitting their skills against each other in progress states during the same game (for example, whether they reach a certain stage of the game, and the like), time required for reaching the termination of the game, scores, and the like (more particularly, it is remarkable that children are pitting their skills against each other). As the commemorative image generated by the commemorative image generation component is an image which is obtained by synthesizing the image of the user on an image representing the progress states or achievements of the game by the user, the progress states or, achievements of a specific user in a game may be easily recognized, referring to the generated commemorative image, and the commemorative image itself may become a status symbol among users who are pitting their skills against each other. Therefore, the improvements in the entertaining performance may be realized, for example, the user may enjoy playing games while aiming at acquisition of commemorative images, as the commemorative image generation component generates the above-described commemorative image.

Here, the commemorative image generation component requests photographing of the user himself with the photographing component to the user, for example, at a predetermined stage corresponding to a turning point of the game, or at termination of the game, and the image of the user may be acquired at the timing by photographing the user with the photographing component. As the user himself is photographed by photographing operation by the user in this case, and a special configuration in which the user is automatically photographed is not required, the game device according to the invention may be easily configured.

Moreover, when the photographing component is arranged so that the user can be photographed under a state that the user is using the game, the image of the user may be also acquired, for example, at a predetermined stage corresponding to a turning point of the game, or at termination of the game, by a configuration in which the commemorative image generation component makes the photographing component automatically photograph the user. In this case, the load of the user for generating the commemorative image according to the invention may be reduced, as the user himself is not required to take an action for photographing the user himself.

Here, the image of the user is not limited to an image, as described above, photographed with the photographing component at a predetermined stage corresponding to a turning point of a game, or at termination of the game, and the image, which has been previously photographed with the photographing component, and stored in the storage component, of the user may be used. In this case, an image which is selected among a plurality of images stored in the storage component by the user after photographing the user with the photographing component at a plurality of times may be also used.

Furthermore, an image representing a game screen (for example, a screen displayed on the display component), for example, at a time when the user has reached a predetermined stage corresponding to a turning point of the game, may be used as the image representing the progress state of the game by the user, and the commemorative image generation component may generate the commemorative image, for example, using the above-described image.

Moreover, as an image representing the achievements of the game by the user, an image expressing clearly at least one of, for example, information (information telling how many stages the user has cleared (reached), for example, when there are turning points such as stage one, stage two, . . . , in the game) for specifying a turning point of the game which the user has finally reached, information representing scores of the game, and information representing time which is required till the turning point of the game is reached, or till the game is terminated may be used. And, the commemorative image generation component can also generate a commemorative image, using, for example, the above image. By using the above-described image, the user referring to the commemorative image may easily recognize the progress state of the game.

In addition, the commemorative image generation component may have a configuration in which the user is photographed with the photographing component, or the commemorative image is generated, whenever the game which the user is using reaches a stage corresponding to a turning point of the above game, or, whenever the game is terminated, the obtained image is stored in a storage component, and, at the same time, the commemorative image in which a plurality of images corresponding to scenes in which a single user has reached each stage corresponding to each of a plurality of turning points of the game, or a plurality of images corresponding to scenes in which each of a plurality of users has reached the same stage of the game, respectively, or a plurality of images corresponding to scenes in which the game is terminated by each of a plurality of users, among images stored in the storage component, are arranged is generated, and is output through the output component.

When, for example, the commemorative image generation component generates the commemorative image in which a plurality of images corresponding to scenes where a single user has reached each stage corresponding to a plurality of turning points of the game are arranged, the circumstances, under which the single user uses the game, of the progress state of the game may be easily grasped by referring to the output commemorative image. Furthermore, when, for example, the commemorative image generation component generates the commemorative image in which a plurality of images corresponding to scenes where a plurality of users have reached the same stage of the game, respectively, or a plurality of images corresponding to scenes where a plurality of users have terminated the game, respectively, are arranged, the achievements may easily compared by referring to the output commemorative image when a plurality of users uses the game. According to the above, the entertaining performance of the game device may be further improved.

And, it is preferable that, according to the first aspect, for example, the commemorative image generation component changes the contents of the commemorative image according to whether the user has met a predetermined conditions or not (for example, whether the final scores of the game has reached a predetermined value or not, or whether a specific stage of the game has been cleared or not, and the like). Here, it is preferable that the contents of the commemorative image is changed so that the user may easily recognize that a benefit is given, for example, an image of a specific character, or an image of a medal is added. Thereby, the entertaining performance may be further improved, as the rareness is more highly evaluated among the users of the commemorative image with the changed contents.

Moreover, it is possible for other persons (for example, parents of a child as the game user) properly to lead the use of the game device by the game user, based on the contents of the predetermined conditions.

That is, it may be used as the predetermined conditions, for example, whether the user has used a specific game among plural kinds of games which the game-providing component provides. When the user of the game device is a child, the user may led so that the user (child) frequently uses the specific game by setting as a specific game a game (for example, a game for study by which problems on subjects such as reading and writing of Chinese characters, arithmetic, and geography are given in a quiz form), among games which the game-providing component provides, which the parent of the above child desires for the child to use. Moreover, the entertaining performance may be improved, as the user may acquire by use of the specific game a commemorative image which is more highly evaluated for the rareness.

And, when the game device is configured for the user to carry, and, at the same time, at least one of a moving distance, an area of a moving range, and a variance of moving places, which are detected with the detection component, of the game device is configured to be able to be acquired, it may be also used as the predetermined conditions whether an evaluation value for at least one of the moving distance, the area of the moving range, and the variance of the moving places which are detected with the detection component is equal to or larger than a predetermined value.

Thereby, as the contents of the commemorative image are changed when an evaluation value for at least one of the moving distance, the area of the moving range, and the variance of the moving places is equal to or larger than a predetermined value, the user behaves so that the evaluation value becomes equal to or larger than the predetermined value, aiming at acquisition of the commemorative image which is more highly evaluated in the rareness, and the user may be led so that generation of withdrawal, and lack of exercise of the user is prevented.

For example, the display component, which can display an arbitrary image, may be used as the output component. In this case, the commemorative image generation component may be configured to display the commemorative image on the display component, and the user may confirm by visual check the commemorative image displayed on the display component.

In addition, for example, a recording component which can record an arbitrary image on a recording material may be used as the output component. In this case, the commemorative image generation component may be configured to record the commemorative image on the recording material with the recording component, and the user may acquired the recording material on which the commemorative image has been recorded. Here, it is preferable from a viewpoint of the operability of the recording material on which the commemorative image is recorded, that the recording component records the commemorative image on the recording material of a predetermined size (for example, the size of a card).

Furthermore, a communication component by which arbitrary information can be transmitted and received to and from an external device (for example, a recording device such as a printer, other game devices, and the like) may be also used as the output component. In this case, the commemorative image generation component may have a configuration in which the image data of the commemorative image is transmitted to the external device through the communication component, and the user may record the commemorative image on the recording material with a printer, may exchange the commemorative image with the owner of the other game device, and the like, using the image data of the commemorative image which has been received with other external devices.

Here, it is preferable that, according to the first aspect, the game-providing component, the photographing component, the commemorative image generation component and the output component are contained in a single case which the user can carry. Thereby, it can be readily performed without any restrictions in the place and time for the user to use the game which the game-providing component provides, and for the output component to output the commemorative image generated with the commemorative image generation component.

A second aspect of the invention provides a game device comprising: a photographing component for photographing a user of a game which a game-providing component provides; and a processing component with which the user is identified by collating an image obtained by photographing the user with the photographing component with images, which have been previously registered, of the user, and predetermined processing is performed according to the current user.

Most of conventional game devices have a configuration in which uniform services are provided to individual users without identifying the user. On the other hand, as a similar photographing component to that of the first aspect is installed in the second aspect, and the processing component identifies the user by collating the image which is obtained by photographing the user with the photographing component with the image of the user which has been previously registered, the user may be automatically identified without requesting complex operations such as input of information for identifying an individual user (for example, a user name, and the like) to the user. Here, the user may be identified by using image processing techniques such as pattern matching.

And, as the processing component performs processing corresponding to the current user, services suitable for an individual user may be provided to each user even when a single game device is used by a plurality of users, and the like. Thereby, the improvement in the entertaining performance of the game device may be realized.

Here, according to the second aspect, the processing component has a configuration in which, as the predetermined processing corresponding to the current user, a scene which the user has reached is stored in a storage component, in correspondence with information for specifying the user when the game which the current user who has been identified is using is interrupted, and, at the same time, when the game is used again by the user, processing controlling the game-providing component is performed, based on information stored in the storage component, so that the game is restarted from the scene which the user had reached.

In this case, services suitable for an individual user are provided to each user by restarting the game automatically from the scene which the individual user has reached at interrupting the use of the game even when an individual user interrupts the use of the game. Accordingly, an individual user may enjoy without any restrictions in time the game which the game-providing component provides.

A third aspect of the invention provides a game device comprising: a photographing component for photographing a user of a game-providing component provides; an image transmission component for transmitting through the communication component the image of the user, who has been photographed with the photographing component, to the other game device when the game-providing component provides the user with a fighting type game, in which the user fights against the other user of the other game device by communication with the other game device through a communication component with which arbitrary information can be transmitted and received to and from the other game device, and a display control component for displaying the image, which has received from the other game device through the communication component, of the user of the other game device on a display component which can display an arbitrary image.

According to the third aspect, a similar photographing component to that of the first aspect and the second aspect is installed, and the image transmission component transmits, by communication with other game devices through the communication component which can transmit and receive an arbitrary information to and from the other game devices, the image of the user which has been photographed with the photographing component to other game devices through the communication component, when the game-providing component provides the user a fighting type game in which the user fights against the other user of the other game device. And, the display control component displays, on the display component by which an arbitrary image can be displayed, the image of the user of the other game device which has been received from the other game device through the communication component. Thereby, as the user may confirm the other party in a fighting type game by referring to the image displayed on the display component, the entertaining performance of the game device may be improved.

As described above, the first aspect has an excellent advantage that the entertaining performance of the game device may be improved, as it is configured that the user is photographed with the photographing component which can photograph the user of the game, at the same time, a progress state or achievements of the game by the user is detected, the commemorative image in which an image of the user, which has been photographed with the photographing component, is synthesized on an image representing the progress state or the achievements of the game by the user is generated, and the commemorative image is output through the output component.

The user may be requested to photograph the user himself with the photographing component at a predetermined stage corresponding to a turning point of the game, or at termination of the game. Thereby, as well as the above-described advantage, another advantage that the configuration of the game device may be made simple is obtained.

The user may be configured to be photographed automatically with the photographing component, at a predetermined stage corresponding to a turning point of the game, or at termination of the game. Thereby, as well as the above-described advantage, another advantage that the load of the user for generating the commemorative image may be reduced is obtained.

As an image representing the progress state of the game, an image representing a game screen at a time when the user has reached a predetermined stage corresponding to a turning point of the game may be used. Thereby, as well as the above-described advantage, another advantage that the user referring to the commemorative image may easily recognize the progress state of the game is obtained.

As an image representing the progress state of the game, an image expressing clearly at least one of information for specifying a turning point of the game which the user has finally reached, information representing scores of the game, and information representing time which is required till the turning point of the game is reached, or till the game is terminated may be used. Thereby, as well as the above-described advantage, another advantage that the user referring to the commemorative image may easily recognize the progress state of the game is obtained.

The user may be photographed with the photographing component, or the commemorative image may be generated, whenever the game which the user is using reaches a stage corresponding to a turning point of the game, or, whenever the game is terminated, the obtained image is stored in a storage component, and, at the same time, the commemorative image in which a plurality of images corresponding to scenes in which a single user has reached each stage corresponding to each of a plurality of turning points of the game, or a plurality of images corresponding to scenes in which each of a plurality of users has reached the same stage of the game, respectively, or a plurality of images corresponding to scenes in which the game is terminated by each of a plurality of users, are arranged may be generated, and may be output. Thereby, there is an advantage that the entertaining performance of the game device may be further improved.

The contents of the commemorative image may be changed according to whether the user has met a predetermined conditions. Thereby, the entertaining performance of the game device may be further improved.

It may be used as the predetermined conditions whether the user has used a specific game among plural kinds of games which the game-providing component provides. Thereby, as well as the above advantages, another advantage that the user may be led so that the user frequently uses a specific game is obtained.

The game device is configured for the user to carry, and, at the same time, it may be used as the predetermined conditions whether an evaluation value of at least one of a moving distance, an area of a moving range, and a variance of moving places, which are detected with the detection component, of the game device is equal to, or larger than the predetermined value. Thereby, as well as the above-described advantages, another advantage that the user may be led so that generation of withdrawal, and lack of exercise of the user is prevented is obtained.

The game-providing component, the photographing component, the commemorative image generation component and the output component may be contained in a single case which the user can carry. Thereby, as well as the above-described advantages, another advantage that it can be friendly performed without any restrictions in the place and time to use the game which the game-providing component provides, and to output the commemorative image is obtained.

According to the second aspect, as the user is identified by collating the image which is obtained by photographing the user of the game with the photographing component with the image of the user which has been previously registered, and a predetermined processing is performed corresponding to the current user, an excellent advantage that the entertaining performance of the game device may be further improved is obtained.

A scene which the user has reached may be stored in the storage component, in correspondence with information for specifying the user when the game which the current user who has been identified is using is interrupted, and, at the same time, when the game is used again by the user, the game-providing component may be controlled so that the game is restarted from the scene which the user had reached. Thereby, as well as the above-described advantages, another advantage that an individual user may enjoy the game without any restrictions in time is obtained.

According to the third aspect, as the image of the user which has been photographed with the photographing component is transmitted to the other game device through the communication component and, at the same time, the image of the other user of the other game device which has been received from the other game device through the communication component is displayed on the display component which can display an arbitrary image, when a fighting type game in which the user fights against the other user of the other game device is provided to the user by communication with the other game device, there is an excellent advantage that the entertaining performance of the game device may be improved.

BRIEF DESCRIPTION OF THE DRAWINGS

FIGS. 1A and 1B are external views of a game device according to a first embodiment.

FIG. 2 is a block diagram showing a schematic configuration of the game device.

FIGS. 3A to 3E are image views showing an example of various kinds of screens displayed on a LCD of the game device.

FIG. 12 is an image view describing an aspect in which a racing game is performed using a game device according to the sixth embodiment.

DESCRIPTION OF THE PREFERRED EMBODIMENTS

Figure 4A:
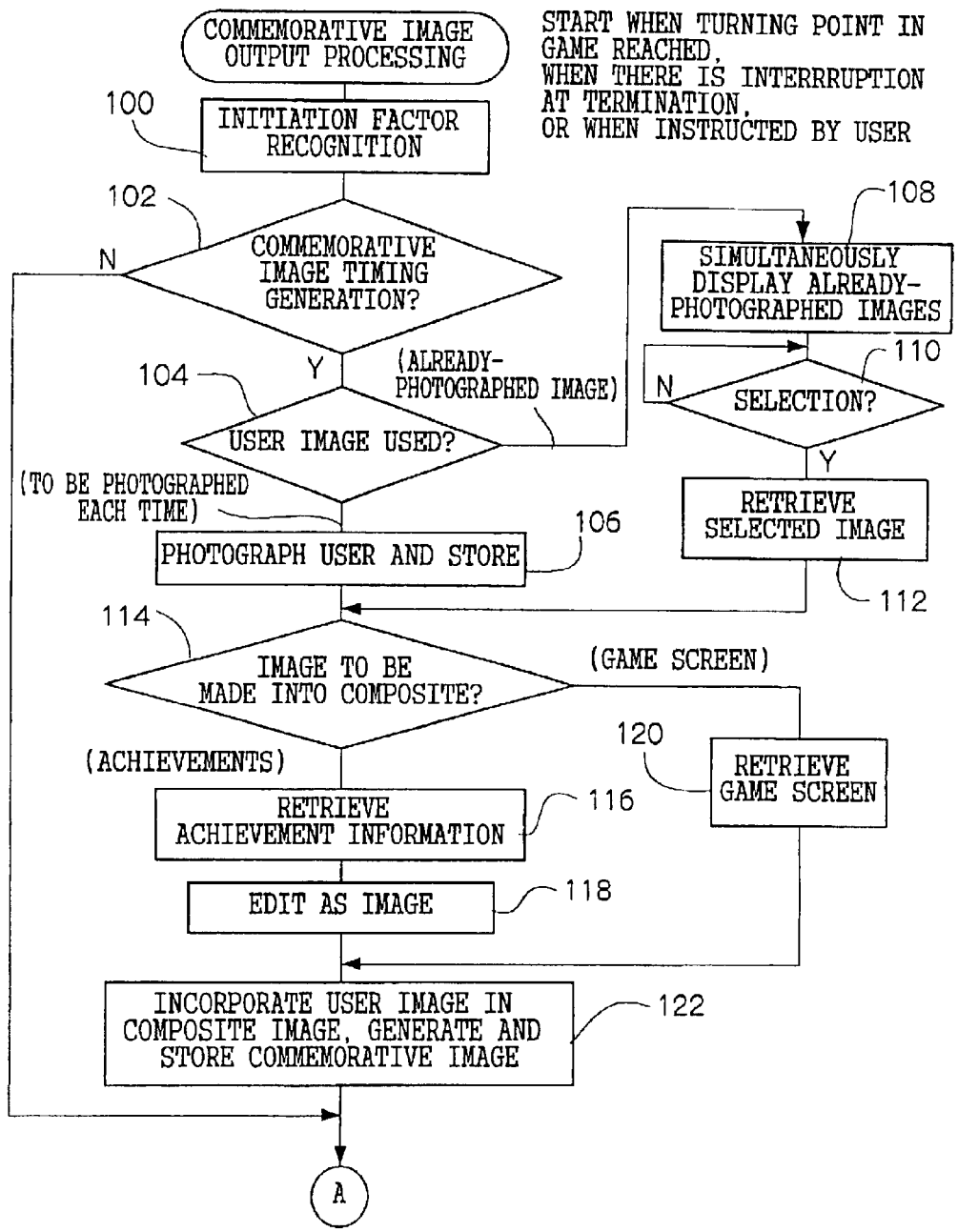
FIGS. 4A and 4B are a flowchart showing contents of processing for outputting a commemorative image according to the first embodiment.

Hereinafter, embodiments of the present invention will be described in detail with reference to the drawings.

First Embodiment

FIG. 1A shows an external view of a game device 10 according to a first embodiment. The game device 10 includes a thin, rectangular main body disposed with a color liquid crystal display (LCD) 12 in an approximate center of a front of the game device 10, and is of a size that is easily portable. The LCD 12 corresponds to a display component of the first aspect. A plurality of switches 14 is disposed beneath the LCD 12 on the front of the main body, and a power switch 16 and a volume controller 18 are arranged on a side (left side as one views FIG. 1A) of the main body. Although the switches 14 shown in FIG. 1A include one cross-shaped and two round control buttons as an example of the switches 14, the switches in the invention are not limited to the same.

As shown in FIG. 2, the game device 10 comprises a central processing unit (CPU) 20, a read-only memory (ROM) 22, a random access memory (RAM) 24, a non-volatile storage component 26 that may rewrite stored contents, and an input/output port 28, with all of these being interconnected through a bus 30. Any one of an electrically erasable programmable read-only memory (EEPROM), or known storage components such as a RAM, a memory card, and a hard disk drive connected to a backup power supply may be applied as the storage component 26.

Control switches 32 (including the switches 14, the power switch 16, the volume controller 18, and the like), the LCD 12 including a LCD driving circuit, a cartridge slot 34, a photographing unit 38, a built-in printer 40, and an expansion slot 46 are respectively connected to the input/output port 28. The photographing unit 38 corresponds to a photographing component of the first through the third aspects, and the built-in printer corresponds to a recording component of the first aspect.

As shown in FIGS. 1A and 1B, the cartridge slot 34 is disposed at the lower side of the main body, and a game cartridge 36 (see FIG. 2), in which a predetermined game program is saved, can be loaded in the cartridge slot 34. In the present embodiment, many kinds of game programs can be saved in the game cartridge 36. Further, in the game device 10 according to the present embodiment, many kinds of game programs saved in the game cartridge 36 are selectively read when the game cartridge 36 is loaded into the cartridge slot 34 for execution by the CPU 20 in order to provide the user of the game device 10 with games. When a game is provided to the user, the CPU 20 functions as a game-providing component according to the invention.

When a large capacity storage component is used as the storage component 26, many kinds of game programs may be previously stored in the storage component 26, instead of the game programs being stored in the game cartridge 36 as described above.

The photographing unit 38 is disposed above the LCD 12 on the front of the main body of the game device 10, as shown in FIG. 1A. The photographing unit 38 comprises a photographing device including an area CCD sensor, a lens in which an optical image is imaged on a receiving surface of the photographing device, and a signal processing circuit for processing (e.g., amplification and analog-to-digital conversion) an image signal outputted from the photographing device. The direction of the photographing device and the lens, and an optical magnification factor of the lens, are set so that the face of the user and the user's surroundings can be photographed when the user is using a game provided by the game device 10. The photographing unit 38 is instructed by the CPU 20 to photograph, and digital image data obtained after signal processing in the signal processing circuit is outputted.

As shown in FIG. 1B, the built-in printer 40 is disposed at the back of the main body of the game device 10, and a loading part, into which a cartridge 44 containing many sheets of recording material 42 can be loaded, is formed near the position at which the built-in printer 40 is disposed (FIGS. 1A and 1B show a state in which the cartridge 44 is loaded into the loading part). Self-developing instant color films that are automatically discharged can be used as the recording material 42. In this case, the built-in printer 40 may use a vacuum fluorescent print head (VFPH) to record images on the recording material 42, but the recording material 42 and the built-in printer 40 are not limited thereto.

The expansion slot 46 is disposed at a side (a right side in FIG. 1B) of the main body. As exemplified in FIG. 2, the expansion slot 46 is configured such that various kinds of cards, such as a wireless card 48, a memory card 50, and a GPS (Global Positioning Systems) card 52, can be loaded into the expansion slot 46. When the wireless card 48 is loaded into the expansion slot 46, the game device 10 can wirelessly communicate with another printer 54 (or another game device) that is able to wirelessly communicate. The wireless card 48 corresponds to communication components of the first and third aspects.

Because the game device 10 can write information such as image data on the memory card 50 when the memory card 50 is loaded into the expansion slot 46, an image represented by the image data that is written on the memory card 50 by the game device 10 can be printed on a recording material by the printer 56 by, for example, the user extracting the memory card 50 on which the information is written from the expansion slot 46 and by setting the card into the other printer 56.

Moreover, when the GPS card 52 is loaded into the expansion slot 46, the CPU 20 can acquire, using the GPS card 52, information representing the current position identified by the GPS card 52 receiving signals from a plurality of GPS satellites. The GPS card 52 corresponds to a detection component of the first aspect.

The operation of the first embodiment will now be described. The game device 10 according to the first embodiment generates a commemorative image, which is a composite of a predetermined image and an image of the user photographed by the photographing unit 38, and outputs the commemorative image. When the user performs a predetermined operation using the control switches 14 while the game device 10 is on, the CPU 20 displays on the LCD 12 a setting screen for generating a commemorative image as exemplified in FIG. 3A.

The setting screen is a screen for the user to effect various settings with respect to the commemorative image to be generated with the game device 10. As exemplified in FIG. 3A, the LCD 12 displays several options beneath the respective headings of "Generation Timing", for defining timing for generating the commemorative image of the game device 10, "User Image", for defining a user image used in the commemorative image, "Composite Image", for defining an image to be made into a composite with the user image when the commemorative image is generated, and "Commemorative Image Display Period", for defining timing for displaying the commemorative image on the LCD 12. Thus, by selecting the desired option under each heading, the user can make various settings relating to the commemorative image. Settings made by the user are stored in the storage component 26 as commemorative image setting information.

Figure 4B:
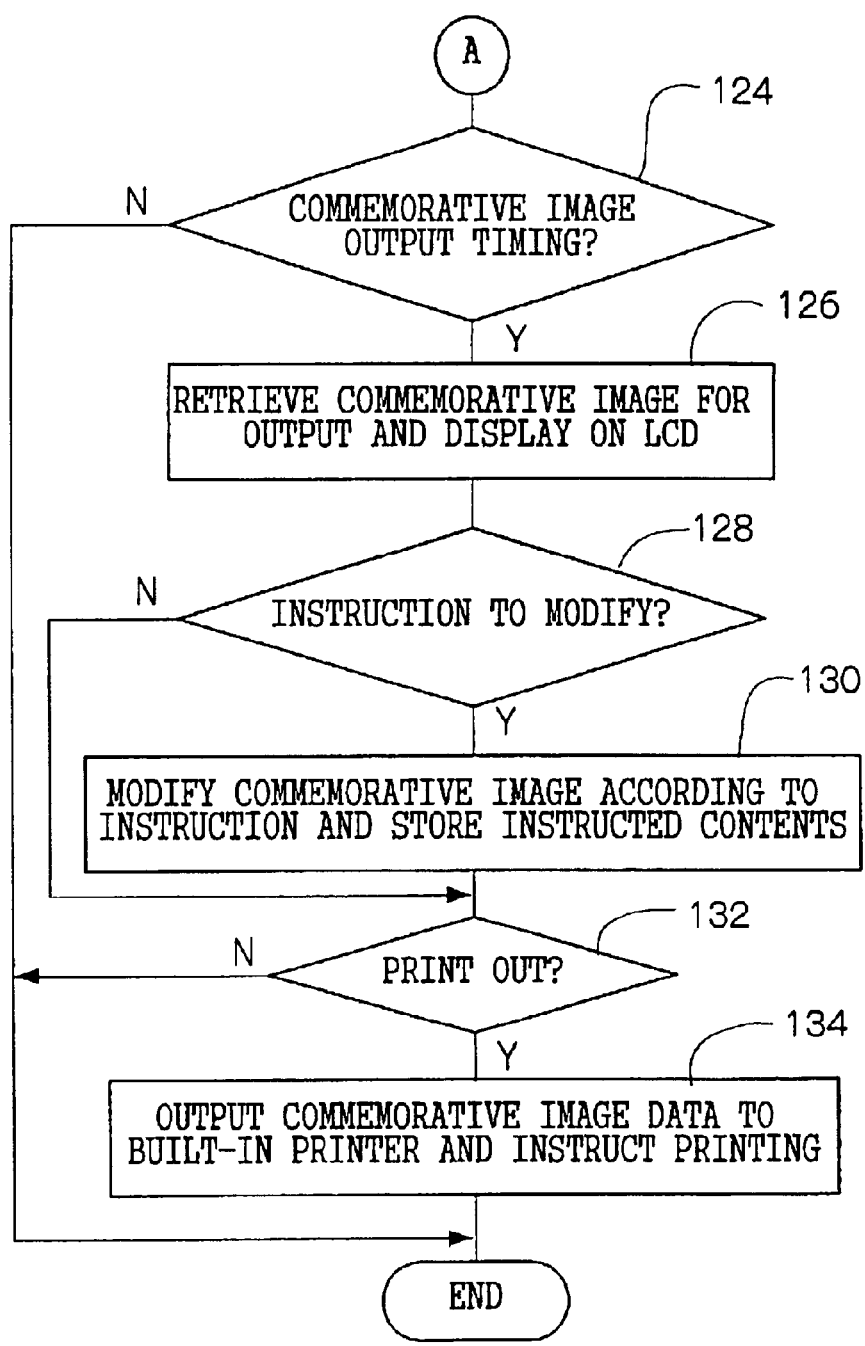

Next, commemorative image output processing executed in the CPU 20 will now be described with reference to the flowchart of FIGS. 4A and 4B. Commemorative image output processing according to the first embodiment is initiated and executed in the CPU 20 when the game that is provided to the user after the CPU 20 executes a game program reaches a turning point (e.g., when a stage in a game comprising several stages has been cleared) or an interruption has been generated by completion of the game, or when the user performs a predetermined operation for outputting the commemorative image through the control switch 14.

In step 100, a factor that commemorative image output processing has been initiated is recognized. In step 102, it is determined whether the current time is timing for generating the commemorative image by collating the initiation factor recognized in step 100 with "Generation Timing" of the commemorative image setting information stored in the storage component 26. In the present embodiment, the two options of "Each time a stage is cleared" (including the termination of the game) and "Only when the game is terminated" are provided as options under "Generation Timing", as shown in FIG. 3A. The determination in step 102 may be made by judging whether the initiation factor recognized in step 100 accords with the contents set in "Generation Timing" of the commemorative image setting information.

When the determination in step 102 is negative, the processing proceeds to step 124. However, when the determination in step 102 is affirmative, it is decided, referring to "User Image" of the commemorative image setting information in step 104, whether the user image used for the commemorative image is to be photographed at the time the commemorative image is generated or has already been photographed and stored in the storage component 26.

In the present embodiment, the two options of "Photograph each time" and "Use already-photographed image" are provided as options under "User Image", as shown in FIG. 3A. When "Photograph each time" is set under "User Image" of the commemorative image setting information, the processing proceeds from step 104 to step 106, where the current user is automatically photographed by the photographing unit 38. Then, image data (user image data) outputted from the photographing unit 38 is stored in the storage component 26, and the processing proceeds to step 114.

It should be noted that the user can select whether or not to use the user image representing the user image data obtained by photography and displayed on the LCD 12, and that the user may be photographed several times if the user decides not to use the displayed user image. Alternatively, a message prompting the user to photograph himself/herself maybe displayed on the LCD 12, and the user can manually photograph himself/herself by operating one of the switches 14 as a shutter button.

When "Use already-photographed image" is set under "User Image" of the commemorative image setting information, the processing proceeds from step 104 to step 108, where all of the user image data stored in the storage component 26 is retrieved while the data is changed into lower resolution data, and user images represented by the retrieved user image data are simultaneously displayed on the LCD 12, as exemplified in FIG. 3B. A message prompting the user to select a user image to be used in the commemorative image is also displayed on the LCD 12. In step 110, it is determined whether or not the user has selected the user image to be used as the commemorative image, and processing is made to stand by until an affirmative determination is made. When the determination in step 110 is affirmative, the processing proceeds to step 112, where the specific user image selected by the user is retrieved from the storage component 26.

In step 114, it is determined whether the image to be made into a composite with the user image when the commemorative image is generated represents the achievements of the user or a game screen, by referring to "Composite Image" of the commemorative image setting information. In the present embodiment, the two options of "Achievements" and "Game Screen" are provided as options under "Composite Image", as shown in FIG. 3A. When "Achievements" is set as "Composite Image" of the commemorative image setting information, processing proceeds from step 114 to step 116, where achievement information representing the achievements of the user stored in a predetermined area by a program of the game the user has been using is retrieved. The achievement information may comprise, for example, at least one of score, time, and rank.

In step 118, the achievement information retrieved in step 116 is edited an image to be made into a composite with the user image, and processing proceeds from step 118 to step 122. It should be noted that the date on which the game was played and the name of the user may also be added on the image to be made into a composite with the user image.

When "Game Screen" is set as "Composite Image" of the commemorative image setting information, the processing proceeds from step 114 to step 120, where image data representing the game screen is acquired by requesting image data representing a game screen at a turning point reached by the user or a game screen at termination of the game with respect to a program of the game the user has been using, and processing proceeds from step 120 to step 122. In step 122, the commemorative image data representing the commemorative image is generated by synthesizing the user image data acquired in step 106 or step 112 with the image data acquired in step 118 or step 120, and the commemorative image data is stored in the storage component 26.

In step 124, it is determined whether or not the current time is the timing when the commemorative image should be outputted ("outputted" in this case means that the commemorative image is displayed on the LCD 12). In the present embodiment, the two options of "Immediately" and "After termination of the game" are provided as options under "Commemorative Image Display Period", as shown in FIG. 3A. The determination in step 124 is affirmative either when "Commemorative Image Display Period" is "Immediately" or when "Commemorative Image Display Period" is "After termination of the game" and the initiation factor recognized in step 100 is "Instructions to output commemorative image by the user". The determination in step 124 is negative in cases other than these.

When the determination in step 124 is negative, commemorative image output processing is terminated without any processing. In this case, the commemorative image is outputted later when the user instructs the commemorative image to be outputted. When the determination is affirmative, processing proceeds to step 126, where the commemorative image data representing the commemorative image for output is retrieved from the storage component 26, and the commemorative image is displayed on the LCD 12 on the basis of the retrieved commemorative image data, as exemplified in FIG. 3C.

It should be noted that, in the example commemorative image display screen shown in FIG. 3C, an image indicating achievements in the game is made into a composite with the user image. Displayed beneath the commemorative image are messages asking the user whether or not the commemorative image is to be edited and whether or not the commemorative image is to be printed out.

In step 128, it is determined whether the user has instructed modification (editing) of the commemorative image. When the determination is negative, processing proceeds to step 132. When the determination is affirmative, processing proceeds to step 130, where the commemorative image is modified according to the modifications instructed by the user. Thereafter, the modified commemorative image is displayed on the LCD 12 again, and the commemorative image data representing the modified commemorative image is written over the original commemorative image data stored in the storage component 26.

Since various types of modification are conceivable with respect to the commemorative image, the user can be allowed to instruct modifications to be made to the commemorative image by, for example, prompting the user to make selections from modifiable items (e.g., position, size and color of the user image, decoration of the commemorative image, etc.) simultaneously displayed in a menu on the LCD 12. When the user selects a specific modifiable item, a predetermined screen for the user to designate in detail the content of the modification related to the selected modifiable item is displayed on the LCD 12, and the user is prompted to instruct the content of the modification.

In step 132, it is determined whether or not the user has given instructions for the commemorative image to be printed out. When the determination is negative, commemorative image output processing is terminated. When the determination is affirmative, processing proceeds to step 134, where the commemorative image data is outputted to the built-in printer 40 and the built-in printer 40 is instructed to print out the commemorative image. The built-in printer 40 then extracts a sheet of the recording material 42 from the cartridge 44 and prints the commemorative image while conveying it at a constant speed. The recording material 42 on which the commemorative image is printed is discharged from the main body of the game device 10, as indicated by "out" in FIG. 1B.

Thus, the user may acquire a commemorative image card 54 as exemplified in FIG. 3D. In this manner, the CPU 20 functions as a commemorative image-generating component according to the invention.

In the above-described embodiment, the commemorative image displayed on the LCD 12 and printed on the recording material 42 is obtained by making a composite of the user image with an image representing the user's achievements in the game. Therefore, by referring to the commemorative image, one can easily identify the progress (e.g., how many screens cleared in a specific game, etc.) or achievements (e.g., score or time achieved in a specific game, etc.) of the user appearing in the user image within the commemorative image. Hence, the commemorative image (in particular, the commemorative image card 54) may become a status symbol among users who are pitting their skills in the same game against each other. Therefore, the entertaining performance of the game device 10 may be improved, for example, so that the user may enjoy playing games while aiming to acquire commemorative images.

It should be noted that, instead of printing out the commemorative image displayed on the LCD 12 as it is, the layout (e.g., position, character font and size, image size, etc.) of the commemorative image may also be changed before the commemorative image is printed out. Moreover, information items not displayed on the LCD 12 (e.g., date on which the game was played, score, time, rank, user name, user image, etc.) can also be added to the front or back side of the commemorative image before it is printed out.

Moreover, instead of generating and outputting a commemorative image every time a stage in a game is cleared or when a game ends, the commemorative image may be generated by photographing the user each time the user has failed to clear a stage or when the game is terminated due to the user's failure to successfully clear all of the stages.

Second Embodiment

A second embodiment of the invention will now be described. Because the second embodiment has the same configuration as that of the first embodiment, elements shared in common will be denoted with the same reference numerals and description thereof will be omitted. Below, only operations different from those of the first embodiment will be described.

In the second embodiment, it is presumed that more than one user uses the game device 10. Giving consideration to generating a commemorative index image, the commemorative image data is stored in correspondence with information, such as the name of the current user, a game ID for specifying a game the user has used, and a stage ID for specifying a stage the user has reached, when the generated commemorative image data is stored in the storage component 26 (step 122 in FIG. 4).

The name of the current user can be acquired by the user inputting his/her name each time commemorative image data is stored. Alternatively, a plurality of names of users using the game device 10 can be preregistered. In the latter case, the registered user names can be simultaneously displayed on the LCD 12 when commemorative image data is stored or when the user begins playing the game, and the user can select the user name from the displayed names. Moreover, the game ID and the stage ID may be acquired by querying the game program.

Figure 5:
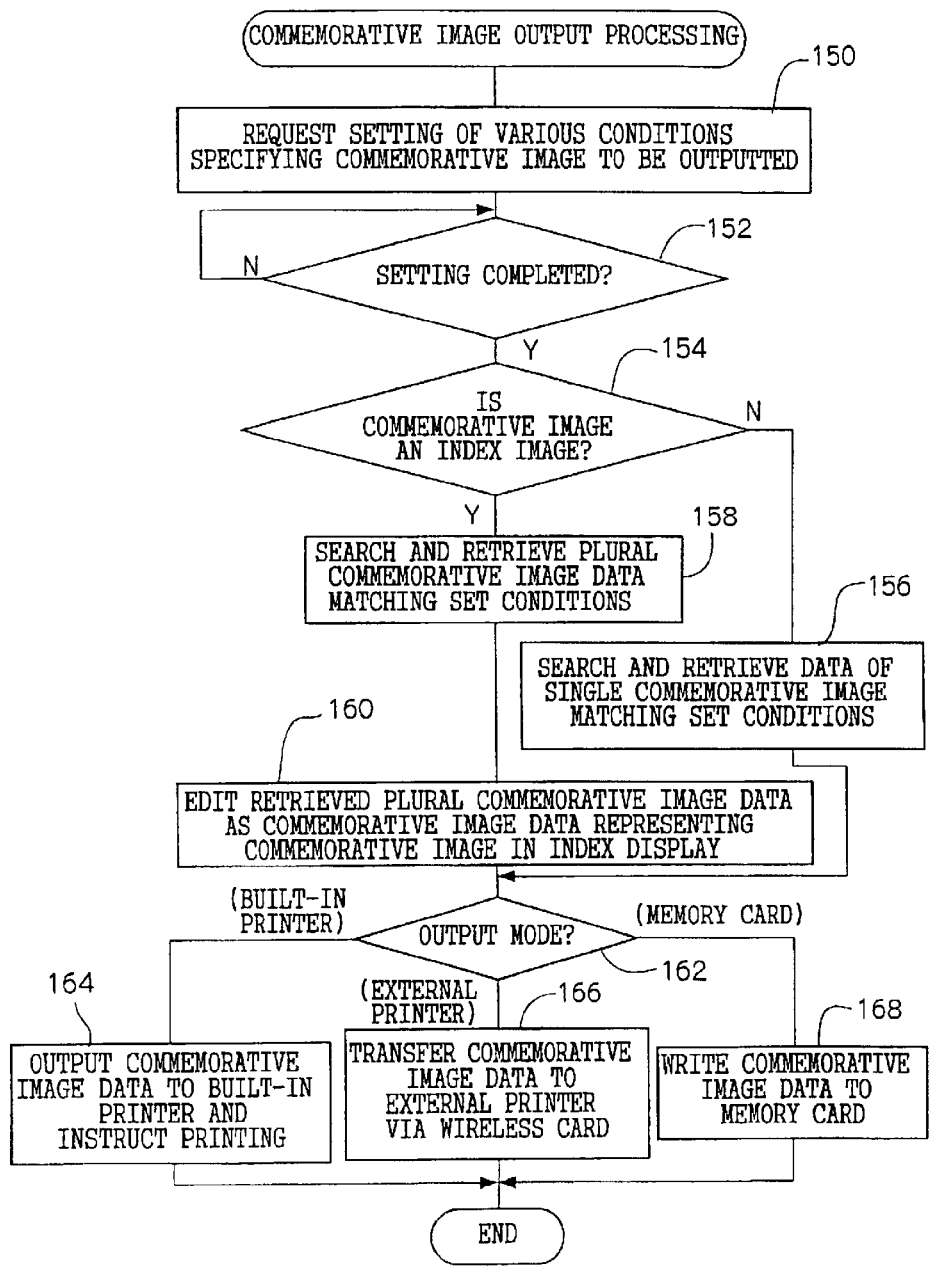
FIG. 5 is a flowchart showing contents of processing for outputting a commemorative image according to a second embodiment.

In the second embodiment, commemorative image output processing shown in FIG. 5 is performed when output of the commemorative image has been instructed by the user.

Commemorative image output processing according to the second embodiment will now be described. In step 150, a screen for setting conditions specifying the commemorative image that is to be outputted is displayed on the LCD 12, and the user is requested to set the conditions. In step 152, it is determined whether or not setting of the conditions has been completed, and processing is made to stand by until an affirmative determination is made.

In the second embodiment, it is possible to output not only a single commemorative image as shown in FIGS. 3C and 3D, but also a commemorative image in which several commemorative images are arranged, for instance, in a matrix (referred to below as "commemorative index image"). In addition, two different kinds of commemorative index images are prepared: a first commemorative index image, in which several commemorative images generated each time a single user clears a stage in a single game (including termination of the game) are arranged; and a second commemorative index image, in which several commemorative images generated when several mutually different users clear the same stage of the same game or conclude the same game are arranged.

Therefore, in the second embodiment, the kind of commemorative image to be outputted (i.e., the single commemorative image, the first commemorative index image, the second commemorative image) is included in the conditions for specifying the commemorative image to be outputted. For instance, when the kind of commemorative image to be outputted is the single commemorative image, the commemorative image can be specified by the user name, game ID, and stage ID. When the kind of commemorative image to be outputted is the first commemorative index image, the commemorative image can be specified by the user name and game ID. When the kind of commemorative image to be outputted is the second commemorative index image, the commemorative image can be specified by game ID and stage ID.

Columns (not shown) for designating conditions with respect to each of the above items are provided in the screen displayed on the LCD 12 in step 150. Setting of the conditions for specifying the commemorative image to be outputted is completed when the user designates these conditions in the columns. When the setting of the conditions is completed, the determination in step 152 is affirmative, and processing proceeds to step 154, where it is determined whether or not the commemorative image to be outputted is a commemorative index image. When the determination is negative, processing proceeds to step 156, where data of a single commemorative image that matches the conditions set by the user is searched, and processing proceeds to step 162 after the single commemorative image datum is retrieved from the storage component 26. In this case, a commemorative image that is the same as that of the first embodiment is outputted.

When the determination in step 154 is affirmative, processing proceeds to step 158, where plural commemorative image data matching the conditions set by the user are searched and read from the storage component 26. In step 160, the plural commemorative image data read from the storage component 26 are edited as commemorative image data representing a commemorative index image in which commemorative images represented by each data are arranged in a matrix.

It should be noted that, when the first commemorative index image is to be edited, the plural commemorative image data can be arranged in a time series. When the second commemorative index image is to be edited, the plural commemorative image data can be arranged in the order of the achievements of each user. Moreover, the image size of each user may be changed according to the achievements of the respective users, and an image representing a medal or the like or a specific character may be selectively added according to the achievements of the respective users.

In step 162, the output mode of the commemorative image is determined. Output mode may be determined by, for example, displaying on the LCD 12 a message requesting the user to select the output mode and then judging the selection result. Alternatively, determination may be made automatically on the basis of whether a card is or is not loaded into the expansion slot 46 and the kind of loaded card.

When it is judged that the commemorative image is to be printed out with the built-in printer 40, processing proceeds from step 162 to step 164, where the commemorative image data is outputted to the built-in printer 40, and the built-in printer 40 is instructed to print the commemorative image. In this case, the commemorative image is printed on the recording material 42 with the built-in printer 40.

When it is judged that the commemorative image is to be printed with the printer 54 separate from the game device 10, processing proceeds from step 162 to step 166, where the commemorative image data is transferred to the printer 54 via the wireless card 48 loaded into the expansion slot 46, and the printer 54 is instructed to print out the commemorative image. In this case, the commemorative image is printed on predetermined recording material with the printer 54. It should also be noted that the commemorative image data can be transferred via the wireless card 48 to another electronic device, such as a personal computer.

When it is determined that the commemorative image data is to be written in the memory card 50, processing proceeds from step 162 to step 168, where the commemorative image data is written in the memory card 50 loaded into the expansion slot 46. In this case, the user can extract the memory card 50, in which the commemorative image data is written, from the expansion slot 46 and set it into another printer 56 with which the commemorative image may be printed out. It is also possible to transfer the commemorative image data to a PC by setting into the PC the memory card 50 in which the commemorative image data is written.

Thus, in the second embodiment, because the commemorative image having the contents desired by the user is outputted according to the output mode preferred by the user, it is possible to improve the entertaining performance of the game device 10. Moreover, when the commemorative image is printed with the printer 54 or printer 56, a commemorative image seal can also be made by changing the size of the commemorative image and printing it out or by printing it on a paper (passe-partout) for making the seal.

It should be noted that the built-in printer 40 may be eliminated if the commemorative image is printed with the printer 54 or the printer 56. In this case, the configuration of the game device 10 may be simplified and the cost of the game device 10 may be reduced.

Moreover, the output mode is not limited to the above. The commemorative image may be written onto a piece of electronic paper (see, for example, Japanese National Publication No. 11-502950).

Furthermore, description has been given of commemorative images of each user being used when the second commemorative index image is generated. However, the present invention is not limited to the same. For instance, each user can be photographed regardless of whether or not a specific stage has been cleared in a specific game corresponding to a specific game ID or specific stage ID, and the images can be edited as the second commemorative index image. In this case, the entertaining performance of the commemorative index image itself may be improved, because differences between respective users in facial expressions reflecting whether the users have cleared or failed to clear specific stages in a specific game can be compared.

Third Embodiment

A third embodiment of the invention will now be described. Because the third embodiment has the same configuration as that of the first embodiment, elements shared in common will be denoted with the same reference numerals and description thereof will be omitted. Below, only operations different from those of the first embodiment will be described.

Figure 6:
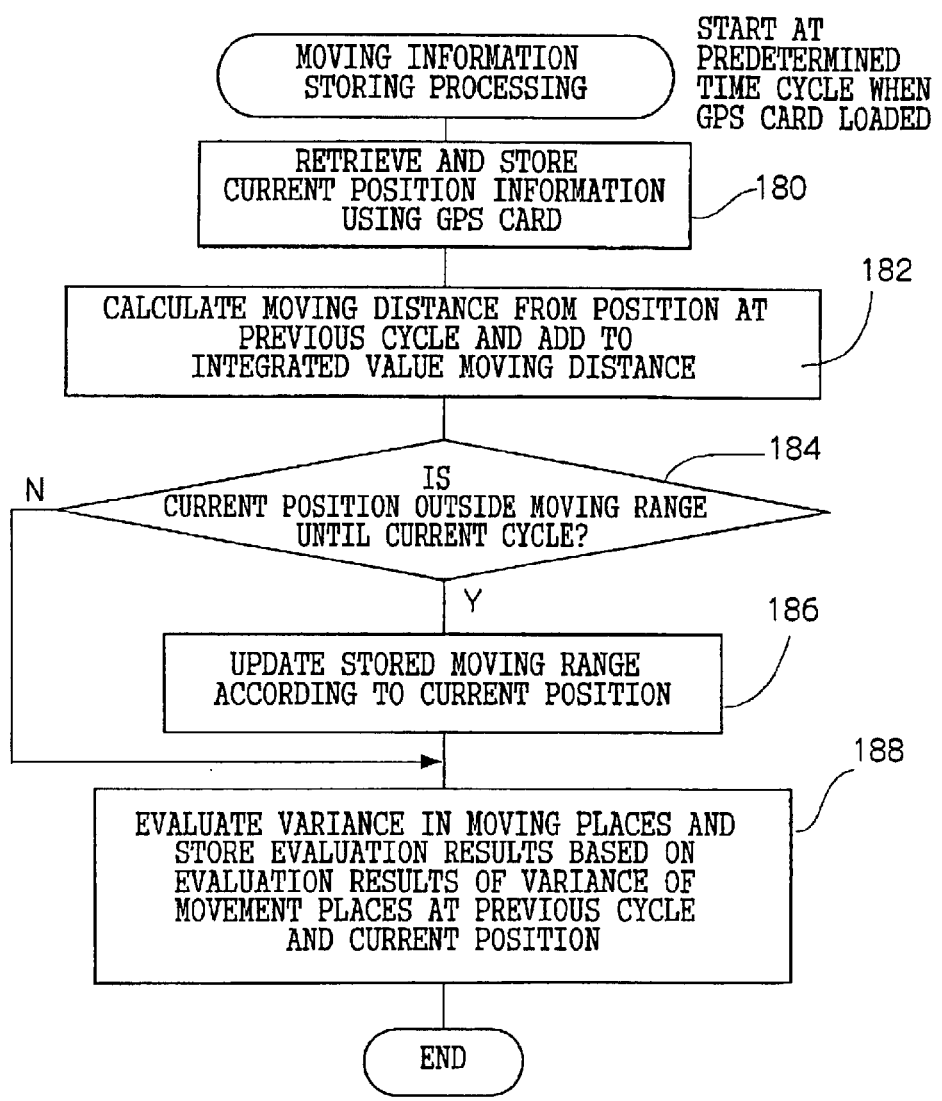
FIG. 6 is a flowchart showing contents of processing for storing moving information according to a third embodiment.

In the third embodiment, when the GPS card 52 is loaded in the expansion slot 46, moving information storage processing shown in FIG. 6 is initiated at a predetermined time cycle and executed in the CPU 20. In step 180, position information representing the current position of the game device 10 (i.e., the current position of the user), which is recognized by the GPS card 52 receiving signals from a plurality of GPS satellites, is acquired from the GPS card 52, and the acquired current position information is stored in the storage component 26.

In the third embodiment, moving history information representing a moving history of the game device 10 (and the user) is stored in the storage component 26. In step 182, the position information stored in the storage component 26 when the moving information storing processing was initiated before (previous cycle) is retrieved, and a moving distance of the game device 10 (and the user) between the current position and the position from the previous cycle is calculated by a predetermined calculation using the retrieved position information and the position information acquired in step 180. The calculated result of the moving distance is then added to an integrated value (initial value is 0), which is a part of the moving history information, of the moving distance until the previous cycle.

The moving history information stored in the storage component 26 includes a moving range of the game device 10 (and the user) until the previous cycle. For example, positions represented by position information stored at each past cycle can be plotted on two-dimensional coordinates (map), and an outer boundary of a graphic group generated when all of the plotted points are connected to each other with straight lines is used as it is for the outer boundary of the moving range. In step 184, it is determined whether or not the current position acquired in step 180 has deviated from the moving range of the game device 10 (and the user) until the previous cycle stored as the moving history information.

When the determination is negative, processing proceeds to step 188. When the determination is affirmative, the moving range stored as moving history information is updated in step 186 according to the current position represented by the position information acquired in step 180, and the updated moving range is stored in the storage component 26 as the moving history information.

The moving history information stored in the storage component 26 includes a result of an evaluation of variance in moving places of the game device 10 (and the user) until the previous cycle. Variance in the moving places may be evaluated, for example, using latitudinal and longitudinal variances in the position information stored at each past cycle. In step 188, variance in the moving places is evaluated on the basis of the result of the evaluation of variance in the moving places until the previous cycle and the current position represented by the position information acquired in step 180. The evaluation result is then written over the evaluation result of variance in the moving places until the previous cycle stored in the storage component 26.

As described above, in the third embodiment, the moving history information is updated in response to the course traveled by the user carrying the game device 10, by the moving information storage processing being periodically executed while the GPS card 52 is loaded in the expansion slot 46.

Also in the third embodiment, use history information, which represents a history of the various games used by the user, is also stored in addition to the moving history information. The use history information comprises a number of times a game has been used by the user (use frequency), use time, and achievements for each kind of game, and is updated whenever the user uses the game.

Figure 7:
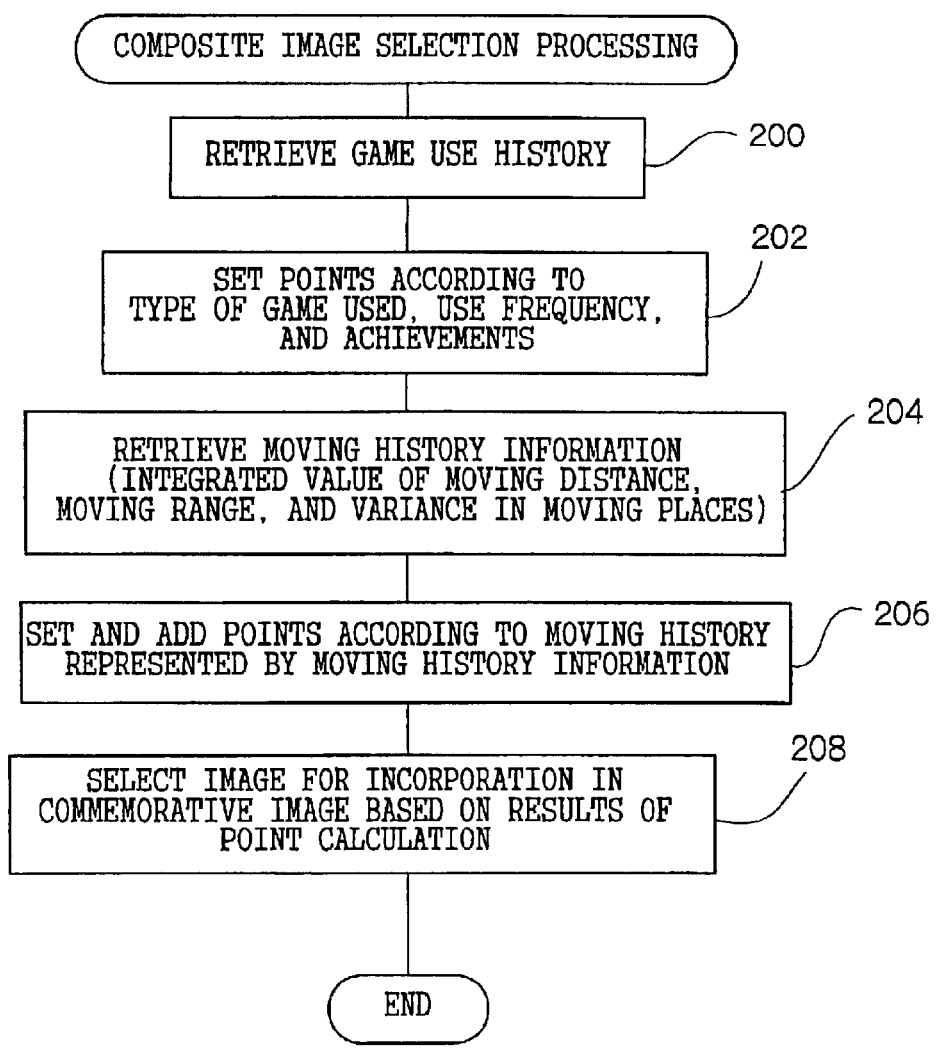
FIG. 7 is a flowchart showing contents of processing for selecting a synthesizing image according to the third embodiment.

Next, description will be given of composite image selection processing executed when the image to be made into a composite with the user image when the commemorative image is generated (e.g., in step 116, step 120, or the like), referring to the flowchart of FIG. 7. In step 200, the use history information is retrieved from the storage component 26. In step 202, a point given to the user is set according to use frequency, use time, and achievements, which have been set in the retrieved use history information for each kind of game. It should be noted that a rule can be adopted that sets a higher point as use frequency, use time, and achievements become higher in a preset specific game.

In step 204, the use history information (the integrated value of the moving distance, the moving range, and the result of the evaluation of variance in the moving places) is retrieved. In step 206, the point given to the user is set according to the moving history represented by the retrieved moving history information, and the set point is added to the point set in step 202. In step 208, an image to be made into a composite with the user image is selected (or edited) as a commemorative image according to the point that the user has finally acquired, whereby composite image selection processing is concluded.

Processing in step 208 may be specifically conducted by preparing in advance images in which the user can easily recognize that special privileges have been conferred, such as an image to which an image of a specific character or an image of a medal or the like has been added. In this case, when points acquired by the user exceed a predetermined value, an image such as those described above can be selected. Alternatively, an image of a specific character or an image of a medal or the like can be added to a predetermined image when points acquired by the user exceed a predetermined value. Moreover, what kinds of images are added can be gradually varied by level as the points the user obtains increase. Additionally, the frequency with which a commemorative image to which an image of a specific character or medal has been added appears can be raised as the points obtained by the user increase.

Commemorative images generated by making a composite of images such as the above with user images become highly valued among users for their rareness, and can therefore raise the ability of the game device 10 to entertain. The user aims to acquire rarer commemorative images and acts in a manner in which it becomes possible to obtain higher points. Thus, when the user is a child, it also becomes possible for parents to guide the child so that the child behaves as the parents wish, by laying down rules for point acquisition.

For example, as mentioned above, a rule that sets a higher point as use frequency, use time, and achievements become higher in a preset specific game can be adopted as a rule for setting a point according to the use history of a game. When this rule is adopted, the game device 10 may be configured so that the specific game can be designated only in a guardian mode, in which the specific game can only be activated when a password written in the recording component 26 is inputted when the game device 10 is purchased.

Thus, when a parent wants a child to use learning games (e.g., games in which problems on subjects such as reading and writing of Chinese characters, arithmetic, and geography are given in a quiz form) executable by the game device 10 when the parent purchases the game device 10 for the child, a password can be inputted into the game device 10 to activate the guardian mode, whereby the child user of the game device 10 may be led to use a game for learning frequently in order to obtain higher points.

Moreover, it becomes possible to eliminate withdrawal and lack of exercise caused by becoming absorbed in games, as the child as a user of the game device 10 may be led to go out to various places in order to acquire higher points, if a rule in which higher points are set the larger the integrated value of the moving distance, moving range, and evaluation result of the variance in moving places become.

It should be noted that special privileges conferred on the user in response to acquired points are not limited to varying the content of the commemorative image as described above. The content of the game can also be changed, for example, by increasing power given to a character corresponding to a hero in a specific game, so that the interest of the user is aroused.

Also, instead of giving points to the user when a specific game is used as described above, points may be given to the user according to the frequency with which the user consults a dictionary after a dictionary function is installed in the game device.

An example has been described in which the current position is recognized using the GPS card 52 described above. However, instead of the GPS card 52, a card functioning as a pedometer (R), or an electronic device that can function as a pedometer (R) and wirelessly communicate with the game device 10 can also be used. In this case, for example, the number of steps may be used instead of the moving distance. Furthermore, instead of information on the current position being acquired using the GPS card 52, information on the current position may be acquired wirelessly via the wireless card 48 from an electronic device having a GPS function (e.g., a personal digital assistant (PDA) or cellular phone).

Furthermore, description has been given of a case where points conferred upon the user according to use is limited to a specific game, but the invention is not limited thereto. Points may be conferred upon the user according to use regardless of the kind of game the user uses. For example, whether each user registered in the game device 10 has cleared or failed to clear respective stages in respective games can be accumulated and stored, the difficulty of respective stages in respective games can be evaluated based on the accumulated and stored information, and points may be conferred upon the user according to the difficulty of the stage cleared whenever the user clears a certain stage in a certain game.

Fourth Embodiment

A fourth embodiment of the invention will now be described. Elements shared in common with the first embodiment will be denoted with the same reference numerals and description thereof will be omitted.

Figure 8A:
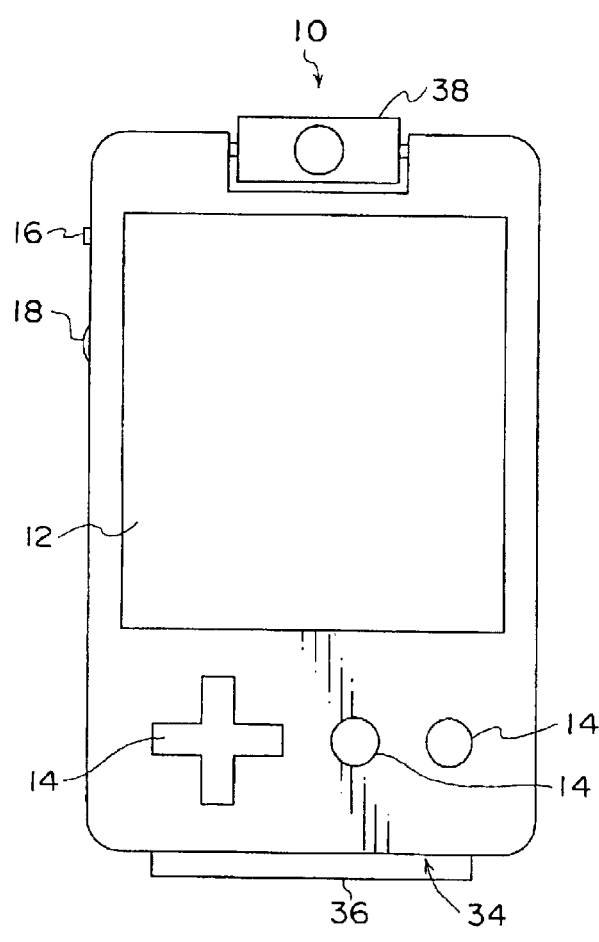
FIGS. 8A and 8B are external views of a game device according to a fourth embodiment.
Figure 8B:
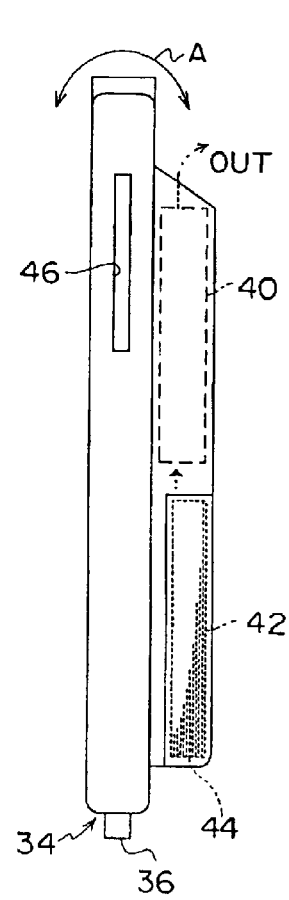

As shown in FIGS. 8A and 8B, in the fourth embodiment, the photographing unit 38 rotatably pivots with respect to the main body of the game device 10. The photographing unit 38 is rotatable between a first position facing and photographing in the same direction as the front of the main body (i.e., a position from which the face of the user and the user's surroundings can be photographed when the user uses the game device 10, as shown in FIG. 8A) and a second position facing and photographing in the same direction as the back of the main body. A zoom lens is used in the photographing unit 38 of the fourth embodiment.

The game device 10 of the fourth embodiment can function as a digital still camera (DSC) when the photographing unit 38 is disposed in the second position. When the game device 10 is used as a DSC, any one of the switches 14 can function as a shutter button, and any one of the other switches 14 can function as a zoom lens control switch. Moreover, photographed image data obtained can be saved in the memory card 50 loaded into the storage component 26 or the expansion slot 46 (a storage medium such as a smart medium, a compact flash (R), or a memory stick may be also used).

Figure 9A:
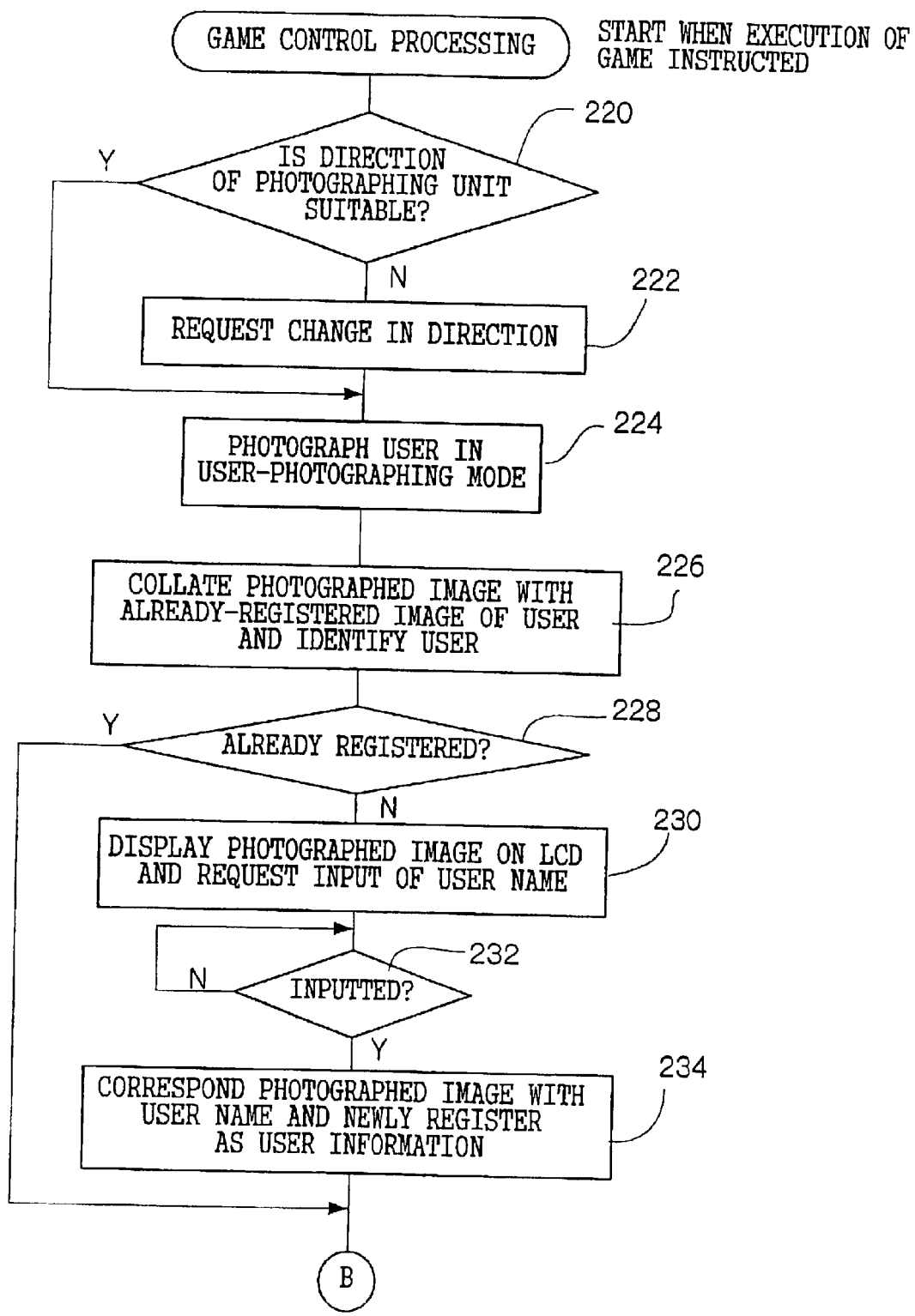
FIGS. 9A and 9B are a flowchart showing contents of processing for controlling a game according to the fourth embodiment.
Figure 9B:
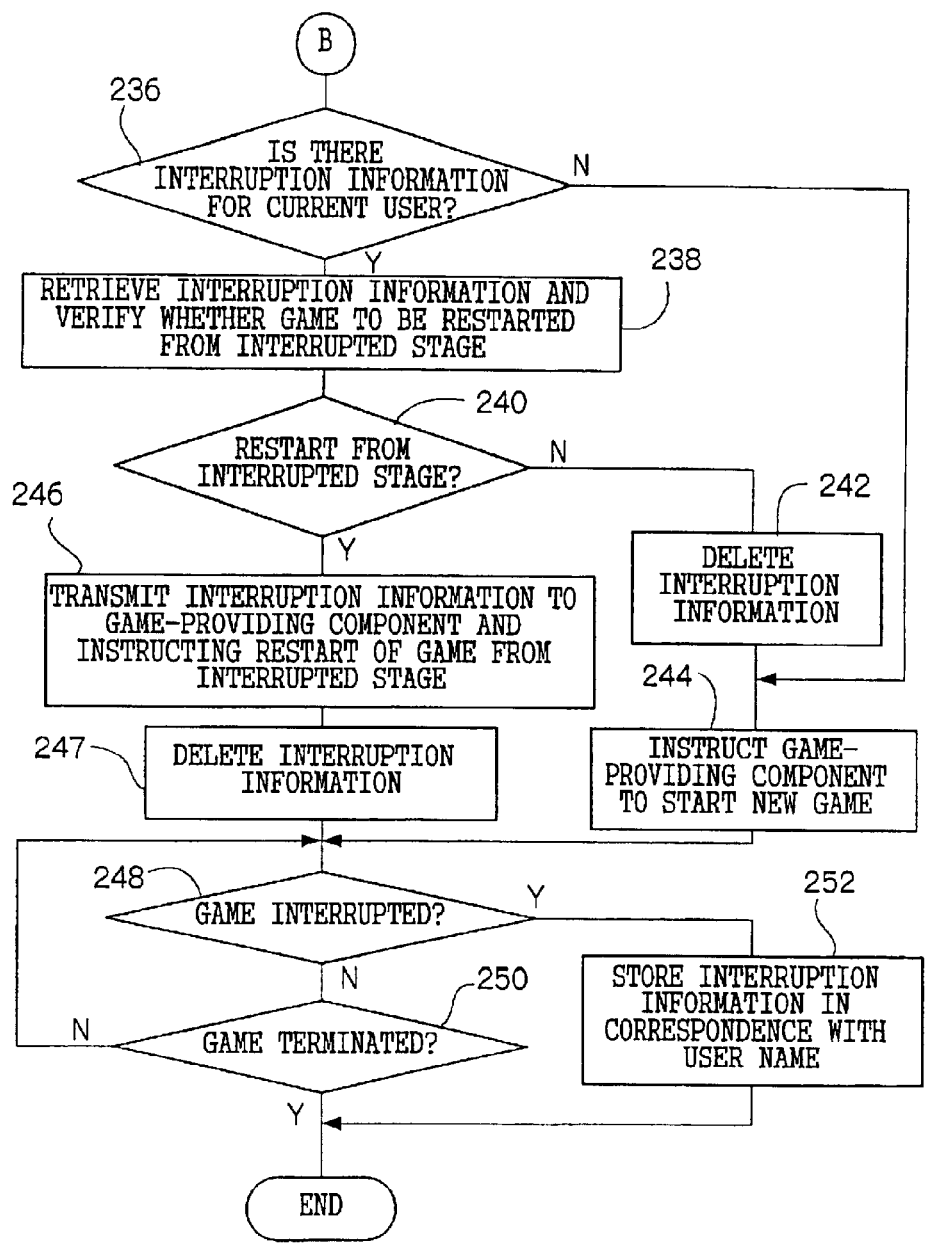

Game control processing, which is initiated when the user instructs game execution and is executed in the CPU 20, will now be described with reference to the flowchart in FIGS. 9A and 9B as an operation of the fourth embodiment. In the fourth embodiment, the face of each user using the game device 10 is previously photographed by the photographing unit 38, and image data of each user obtained thereby is stored as user information in the storage component 26 in correspondence with information such as user names.

In the game control processing of the fourth embodiment, processing such as identification of the current user is performed in steps 220 to 234 before execution of the game, based on the instruction of the user. That is, it is determined in step 220 whether or not the photographing unit 38 is located in the first position. When the determination is negative, the photographing unit 38 is positioned in the first position in step 222 by displaying on the LCD 12 a message requesting the user to change the direction of the photographing unit 38.

In step 224, the current user is automatically photographed with the photographing unit 38 in a user-photographing mode suitable for photographing the user. As described later, in order to use the image obtained in step 224 to identify the user, the zoom lens is driven in the user-photographing mode to change the optical magnification to thereby focus on, and take a close-up shot of, the face of the user, which is a comparatively close distance away.

It should be noted that, in the user-photographing mode, facial region trimming can also be automatically conducted, so that a facial region corresponding to the face of the user is extracted from the obtained user image by known face-extraction processing, and the facial region has a predetermined size and is located at a constant position in the image. The sharpness of the facial region may be improved by processing to enhance the sharpness of the user image obtained by photographing.

In step 226, the current user is identified by collating image data representing the image of the current user obtained by photographing in step 224 with image data of respective users previously stored in the storage component 26. Various kinds of known techniques can be applied to identify the user. For example, pattern matching and comparing density in pixel units may be applied. The user can be also identified by extracting a predetermined amount of image features from each image using image processing, such as edge extraction and thinning of the extracted edge, and comparing the predetermined amount of image features between images to be collated with each other.

In step 228, it is determined, based on the result of the identification of the current user in step 226, whether the current user has been registered as a user of the game device 10. When the determination is affirmative, processing proceeds to step 236. When the determination is negative, processing proceeds to step 230, where the obtained image of the current user is displayed on the LCD 12 together with a message requesting input of the user's name (see FIG. 3E), whereby the current user is prompted to input a user name.

In step 232, it is determined whether the user name has been inputted or not, and processing is made to stand by until an affirmative determination is made. The determination is affirmative when the user name is inputted by the current user. Processing then proceeds to step 234, where image data of the current user is newly registered as user information in the storage component 26 in correspondence with the inputted user name.

In step 236, it is determined, based on the result of identification of the current user in step 226, whether or not current user interruption information relating to the game instructed to be executed has been stored in the storage component 26. The interruption information is information that has been stored in the storage component 26 in correspondence with the user name when the user has given notification that the game is to be interrupted while the user is in the middle of using the game. When there is no corresponding interruption information, the decision in step 236 is negative and processing proceeds to step 244, and the game-providing component (game program corresponding to the game instructed by the user for execution) is instructed to start a new game. In this case, the game instructed for execution by the user is executed from the beginning.

In step 248, it is determined whether or not the user has instructed that the game being executed is to be interrupted. When the determination is negative, processing proceeds to step 250, where it is determined whether or not the game being executed has been terminated. When the determination is negative, processing returns to step 248 and steps 248 and 250 are repeated until either an affirmative determination is made in either step.

When the game being executed is concluded without an instruction to interrupt the game, the determination in step 250 is affirmative, and game control processing is terminated without any processing. However, when the user has instructed interruption of the game before the game being executed has concluded, the determination in step 248 is affirmative and processing proceeds to step 252, where the game-providing component is instructed to terminate the game midway. Additionally, interruption information representing the point of interruption in the stage in the game (e.g., the number of stages cleared) is acquired from the game-providing component, and the acquired interruption information is stored in the storage component 26 in correspondence with the user name and the ID of the game being executed.

As described above, when the interruption information is stored in the storage component 26 and the same user instructs execution of the same game, game control processing is started again. When the same user is identified through the user identification processing in steps 220 to 234, the determination in step 236 is affirmative and processing proceeds to step 238. In step 238, the interruption information stored in the storage component 26 is retrieved and the user is asked, by displaying a message on the LCD 12, whether the game is to be restarted from the stage at which it was interrupted.

In 240, it is determined whether or not the user has instructed that the game be restarted from the interrupted stage. When the determination is affirmative, processing proceeds to step 246, where the interruption information is sent to the game-providing component, and the game-providing component is instructed to restart the game from the stage represented by the interrupt information. In step 247, the corresponding interruption information is deleted from the storage component 26, and processing proceeds to step 248. Thus, the user may enjoy the game instructed for execution from the stage at which it was interrupted.

When the determination in step 240 is negative, the interruption information is deleted from the storage component 26 in step 242, and in step 244 the game-providing component is instructed to start a new game. In this case, the user may enjoy the game instructed for execution from the beginning.

Fifth Embodiment

A fifth embodiment of the invention will now be described. Because the fifth embodiment has the same configuration as that of the fourth embodiment, elements shared in common will be denoted with the same reference numerals and description thereof will be omitted. Below, operation of the fifth embodiment will be described.

The game device 10 of the fifth embodiment is disposed with a function by which a specific user can limit game use to a specific time frame within a specific day. The function of use limitation is activated by preregistering information, such as exemplified in Table 1, in the storage component 26.

TABLE 1

| | Day | Time Frame | User | Limitation |
|---|---|---|---|---|
| 1 | Every Workday | 8:00–12:00 | A | Prohibition of Complete Use |
| 2 | Every Workday | 13:00–17:00 | A | Prohibition of Complete Use |
| 3 | Every Workday | 17:00–19:00 | A | Number of Times Use is Permitted = 2 |
| . | . | . | . | . |
| . | . | . | . | . |

The use limitation information shown in Table 1 comprises the headings of "Day", "Time Frame", "User", and "Limitation". Use limitation conditions are set by setting information corresponding to each item. The use limitation information can also be set in a special mode such as the guardian mode that is activated only when a password written in the storage component 26 is inputted when the game device 10 is purchased.

Figure 10:
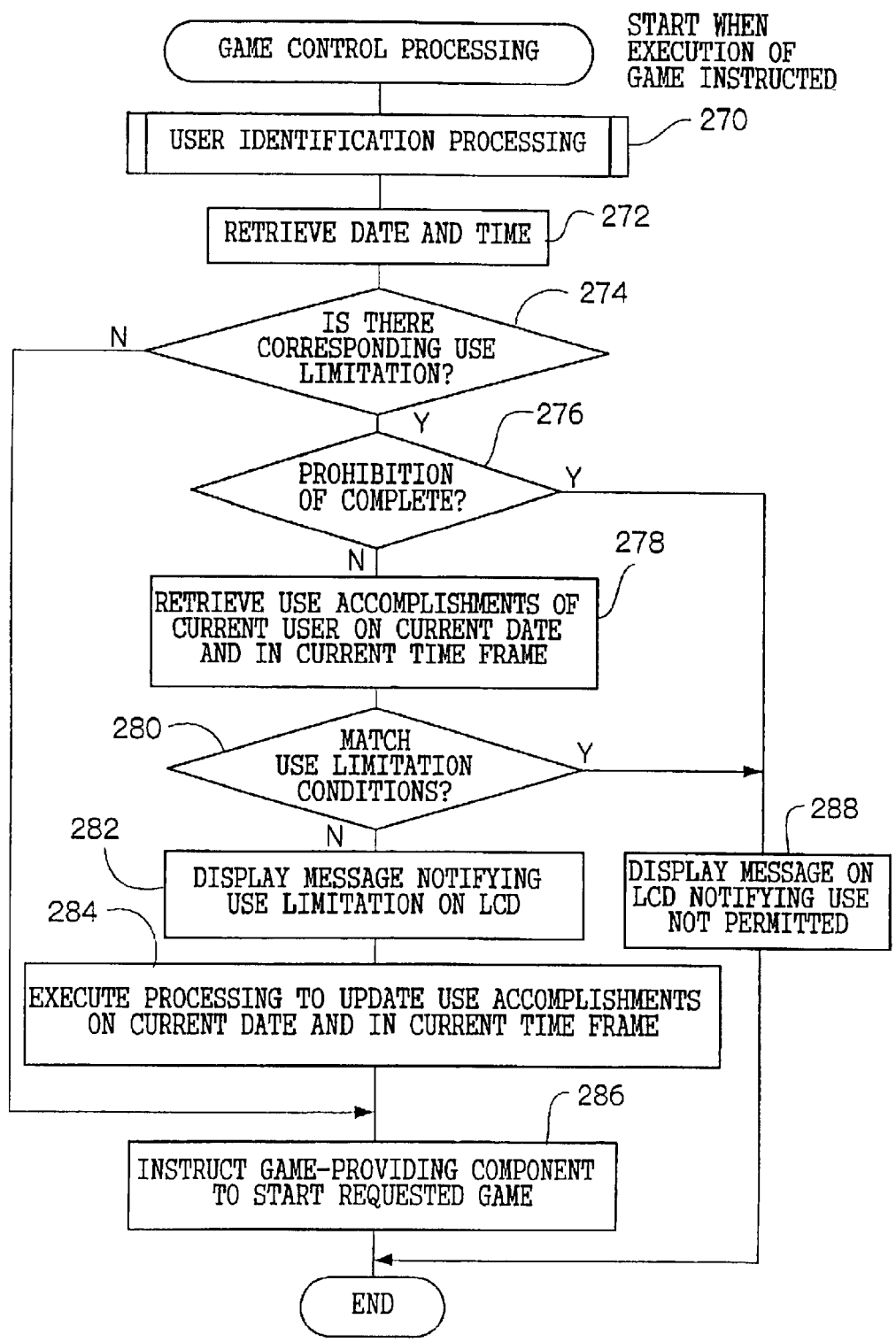
FIG. 10 is a flowchart showing contents of processing for controlling a game according to a fifth embodiment.

Game control processing according to the fifth embodiment will now be described with reference to the flowchart in FIG. 10. Here also, game control processing is initiated when the user instructs game execution and is executed in the CPU 20.

In step 270, user identification processing is conducted in a manner similar to steps 220 to 234 (see FIG. 9) in the fourth embodiment. In step 272, the current date and time are retrieved. In step 274, use limitation information stored in the storage component 26 is retrieved, using as a key the name of the current user identified in step 270 and the current date and time retrieved in step 272, and it is determined whether or not corresponding use limitations have been registered. When the determination is negative, processing proceeds to step 286, the game-providing component (game program corresponding to the game instructed by the user for execution) is instructed to start the game, and game control processing is terminated. In this case, the user may use the game.

When the determination in step 274 is affirmative, processing proceeds to step 276, where it is determined whether or not the user is completely prohibited from using the game on the current date and at the current time, referring to the "Limitation" of the corresponding use limitation information. When information representing "Prohibition of Complete Use" is set under "Limitation" (see Table 1), the determination is affirmative and processing proceeds to step 288, where a predetermined message is displayed on the LCD 12 and the user is notified that the game may not be used on the current date and at the current time. Game control processing is then terminated without executing the game program. In this case, the user is prohibited from using the game.

When information representing "Prohibition of Complete Use" is not set under "Limitation" (for example, when the limitation is set as "Number of Times Use is Permitted=2"), the determination in step 276 is negative and processing proceeds to step 278, where use accomplishment information representing use accomplishments (e.g., use frequency and use time) of the current user on the current date and at the current time are retrieved (initial value of use accomplishments represented by the corresponding information is zero).

In step 280, it is determined whether or not the use accomplishments represented by the use accomplishment information fetched in step 278 match (have reached) the "Limitation". When the determination is negative, processing proceeds to step 282, where a message indicating the game use limitation is displayed on the LCD 12. In step 284, processing is performed to update the use accomplishments in the game used by the current user on the current date and within the current time frame. Specifically, for example, the use frequency is incremented by one, and a timer for measuring the time the game is used by the user is started. Because processing proceeds to step 286 after processing in step 284 is completed, the user may use the game.

However, in this case, when the use accomplishments updated by processing in step 284 match (have reached) the "Limitation", the determination in step 280 is affirmative and processing proceeds to step 288, whereby the user is prohibited from using the game.

In the fifth embodiment, use of the game by a specific user is limited according to the use limitation conditions defined by the use limitation information. Therefore, parents can easily prohibit their children from using the game device 10 during time frames such as school hours.

It should be noted that the game device 10 can also be configured (in addition to simply displaying a message on the LCD 12) so that parents of child users of the game device 10 can prerecord an audio or video warning message and write the warning message into the game device 10. Thus, when use accomplishments represented by the use accomplishment information match (have reached) the "Limitation", the prerecorded warning message is played back.

Moreover, the game may be prohibited from being used when the current position acquired as described in the third embodiment corresponds to a prohibited place of use, assuming that the GPS card 52 is loaded into the expansion slot 46 and the prohibited place (e.g., school) is included in the use limitation information.

Sixth Embodiment

A sixth embodiment of the invention will now be described. Because the sixth embodiment has the same configuration as that of the first embodiment, elements shared in common will be denoted with the same reference numerals and description thereof will be omitted. Below, operation of the sixth embodiment will be described.

Figure 11:
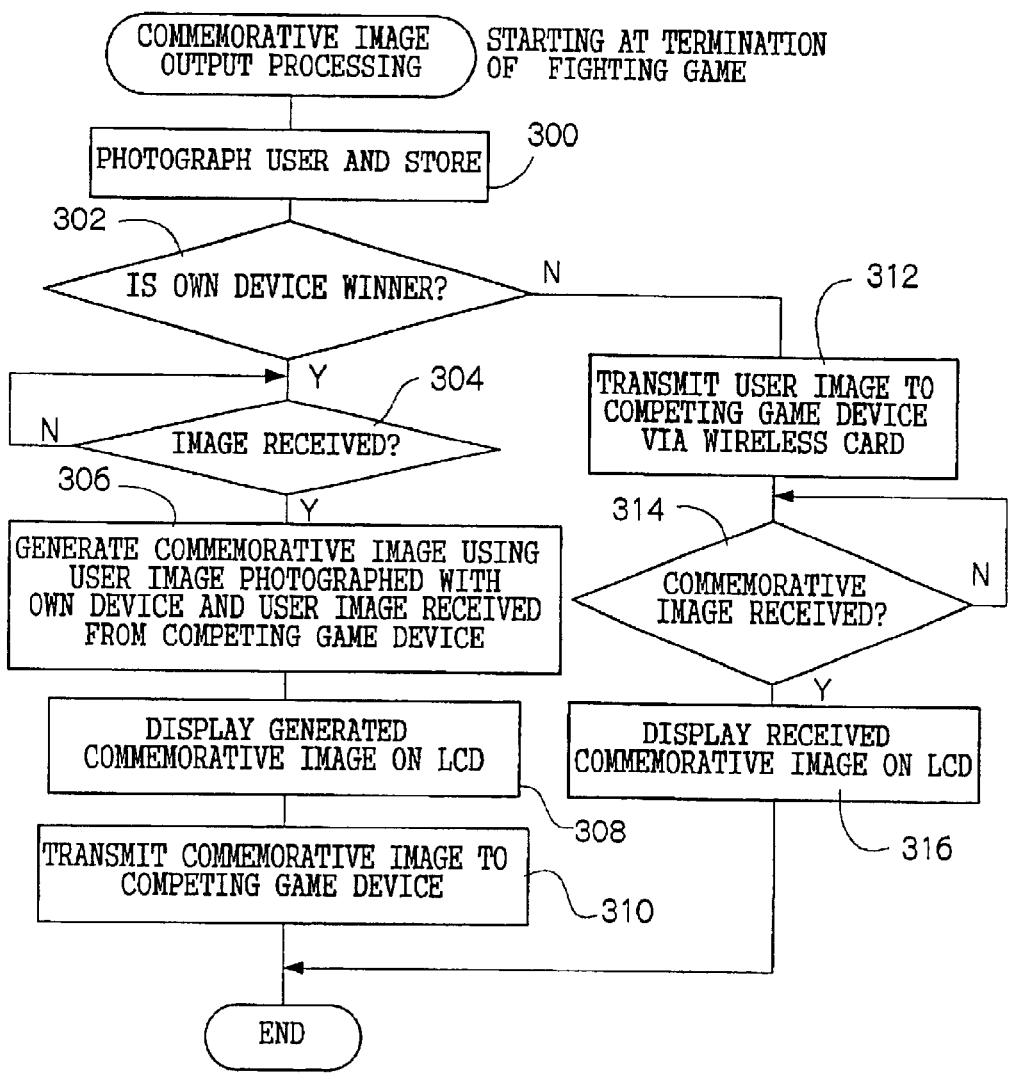
FIG. 11 is a flowchart showing contents of processing for outputting a commemorative image according to a sixth embodiment.

In the game device 10 of the sixth embodiment, a fighting game, in which a user fights with another user of another game device 10, can be provided to the user by wireless communication with other game devices 10 through the wireless card 48 loaded into the expansion slot 46. In the sixth embodiment, when the fighting game is terminated, commemorative image output processing shown in FIG. 11 is started and executed in both of the game devices 10.

In commemorative image output processing of the sixth embodiment, the current users are automatically photographed with the photographing units 38 in step 300, and the obtained user image data is respectively stored in the storage components 26. Thus, facial expressions of the users of both game devices 10 immediately after termination of the fighting game are respectively converted into image data.

In step 302, it is determined whether or not the user of the game device 10 is the winner of the fighting game. When the determination is affirmative, processing proceeds to step 304, where it is determined whether the image of the user of the other game machine 10 (the loser) has been received from the other game device 10, and processing is made to stand by until the determination is affirmative.

When the determination in step 302 is negative, processing proceeds to step 312, where the user image data obtained in step 300 is transmitted to the other game device 10 (the winner) via the wireless card 48. In step 314, it is determined whether commemorative image data has been received from the other game machine 10, and processing is made to stand by the determination is affirmative.

The determination in step 304 becomes affirmative when the user image data transmitted in step 312 is received by the winning game device 10, and processing proceeds to step 306. In step 306, the commemorative image data representing the commemorative image is generated using the image data of the user photographed with his/her own game device 10 and the user image data received from the other game device 10. For example, an image comprising a composite of respective images of the users and images representing a game screen at a stage where the outcome of the game was decided may be used as the commemorative image.

In step 308, the commemorative image generated in step 306 is displayed on the LCD 12. In step 310, the commemorative image data is transmitted to the losing game device 10 via the wireless card 48, and commemorative image output processing is concluded.

The determination in step 314 is affirmative when the commemorative image data transmitted in step 310 is received from the losing game device 10, and processing proceeds to step 316, where the commemorative image represented by the received commemorative image data is displayed on the LCD 12, and commemorative image output processing is concluded.

The same commemorative image is thereby displayed on the LCD 12 of each game device 10 competing in the fighting game. Because the commemorative image of the sixth embodiment comprises a composite of images of the users competing in the fighting game, each user may easily recognize the competing user by referring to the commemorative image. Moreover, as the users are photographed immediately after the fighting game is terminated, differences in the facial expressions of each user corresponding to the result of the game may be compared, and the entertaining performance of the commemorative image itself may be improved.

It should be noted that the mode of use of the game device 10 disposed with the photographing unit 38 is not limited to the modes described in the preceding embodiments. For example, the game device 10 can function to remotely control a model racing car. Several users having the game devices and model racing cars can compete in a race by remotely controlling the model racing cars via the game devices 10. Description will be given of such a race below.

The model racing car in this game includes a microphotographing unit for photographing a scene in front of the driver's seat, which scene is equivalent to the field of view seen from the driver's seat. The photographed scene is wirelessly transmitted in real time to the game device 10 and displayed as a moving image on the LCD 12 of the game device 10. Each user operates the control switches 14 to control the racing cars by referring to the moving image displayed on the LCD 12 of each user's respective game device 10.

In this mode, the game devices 10 of the users can be easily synchronized by wireless intercommunication among the game devices to the same timing, such as the instant one of the racing cars reach the goal. Therefore, the commemorative image may be generated and outputted by sampling moving images each game device 10 receives from the photographing units of the racing cars, photographing the users at the moment one of the racing cars reaches the goal, and transmitting and receiving each image (images of the user and of the scenes viewed from the drivers' seats within each racing car at the moment one of the cars reaches the goal) among each game device 10 for the composite.

Moreover, the commemorative image may be generated and outputted as exemplified in FIG. 12. In this instance, there are plural game devices 10 (denoted by reference numerals 10A and 10B in FIG. 12) that control model racing cars, with another game device 10 (denoted by reference numeral 10C in FIG. 12) being disposed at the goal position. A composite image including an image photographed with the game device 10C at the moment a car reaches the goal can therefore be created. Alternatively, rather than simply one image photographed at the moment a car reaches the goal, the game device 10C can be configured to shoot images at a comparatively short cycle before, during, and after a car reaches the goal. The obtained images can thus be arranged in an index and used for the commemorative image. Furthermore, the moment one of the cars reaches the goal may be photographed by any one of the plural game devices 10 controlling the model racing cars. In this case, a previously photographed image or an image photographed after the moment one of the cars reaches the goal may be used as an image of the user of the corresponding game device 10. Moreover, achievements of each user (such as time) and images of meters (unreal game images) may be made into a composite for the commemorative image.

In the above-described aspect, it is necessary to transmit to each game device 10 the moment one of the cars reaches the goal in order to synchronize the timing at which the respective game devices 10 photograph that moment. This may be realized by a configuration in which goal signals are transmitted to each game device 10 when a transmitter located at the goal responds to one of the cars. Synchronization may also be realized by disposing at the goal a sensor that reacts to passage of a car through the goal, whereby goal signals are transmitted to each game device 10. Alternatively, a specific game device 10 (e.g., the game device 10C positioned at the goal) may be used as a reference, with goal signals being transmitted to each game device 10 from the reference. Moreover, a signal defining the moment a car has reached the goal can be transmitted from the reference to each game device 10 so that each game device 10 photographs and stores a moving image, and images corresponding to the moment a car has reached the goal can be extracted among the photographed and stored moving images on the basis of the received signals.

In an aspect where the photographing unit is disposed in an object to be controlled by the game device 10, such as described above, where images photographed with the photographing unit are received wirelessly and displayed on the game device 10 to create the commemorative image, the object disposed with the photographing unit is not limited to the model racing car (remote control toy). The photographing unit may also be disposed in an autonomously moving toy, such as a robotic toy (e.g., AIBO (trade name)), and images photographed with the photographing unit can be wirelessly received and used as described above.

Description has been given of a case where a still image of the user is photographed, but the invention is not limited to the same. A moving image of the user may be also photographed for a comparatively short time (e.g., several seconds), and the commemorative image maybe generated using a still image selected by the user from among the frames forming the moving image.

In addition, the game device 10 can include a microphone and a signal processing circuit for amplifying voice signals outputted from the microphone and converting the signals into digital voice data, with predetermined processing being performed after the voice generated by the user is recognized. The predetermined processing can include, for example, registration of user names by voice, identification of users, and reading out of information on the identified users (e.g., the interruption information described in the fourth embodiment). When an arbitrary message is voice-inputted by a user at the time a certain stage in a certain game is cleared, the voice can be converted into text or specific characters by voice recognition and then made into a composite in the commemorative image displayed on the LCD 12 or the commemorative image that is printed out. Because voice recognition processing places a large burden on the CPU 20 of the game device 10 and is not preferable, the voice data can be outputted to the printer 54, and the printer 54 can effect voice recognition processing.

Although description has been given of an example in which the game device of the invention is of a size that is easily portable by a user, the game device of the invention is not limited to the same. It goes without saying that output of commemorative images, identification of users, and image display of the competing party in a fighting game according to the invention can be applied to a game device fixed in a game center or other facilities. Moreover, a photographing component may be structured apart from the main part of a game device.

What is claimed is:

1. A game device comprising:

a photographing component for photographing a user of a game provided by a game-providing component: and a commemorative image-generating component for effecting photographing of the user by the photographing component, detecting progress and a score in the game used by the user, generating a commemorative image by making a composite of an image representing the progress and the score and an image of the user, and outputting of the commemorative image via an outputting component, wherein the commemorative image-generating component generates the commemorative image using, as an image representing achievements by the user in the aame used by the user, an image clearly indicating at least one of information for specifying a turning point in the game that the user has finaly reached, information representing a aame score, and information representing either time required until a turning point in the game is reached or time required until the game concludes.

2. The game device of claim 1, wherein the commemorative image-generating component effects photographing of the user by the photographing component by prompting the user to photograph himself/herself with the photographing component when the game the user is using reaches a stage corresponding to a turning point in the game or when the game concludes.

3. A game device comprising:

a photographing component for photographing a user of a game provided by a game-providing component: and a commemorative image-generating component for effecting photographing of the user by the photographing component, detecting progress and a score in the game used by the user, generating a commemorative image by making a composite of an image representing the progress and the score and an image of the user, and outputting of the commemorative image via an outputting component, wherein the photographing component is disposed so that the user is photographed when the user is using the game, and the commemorative image-generating component effects automatic photographing of the user by the photographing component when the game the user is using reaches a stage corresponding to a turning point in the game or when the game concludes.

4. The game device of claim 1, wherein the commemorative image-generating component generates the commemorative image using, as an image representing progress of the user in the game used by the user, an image representing a game screen at a time when the game the user is using reaches a stage corresponding to a turning point in the game.

5. The game device of claim 1, wherein the commemorative image-generating component effects photographing of the user by the photographing component or generates the commemorative image each time the game used by the user reaches a stage corresponding to a turning point in the game or each time the game concludes, stores the obtained image in a storage component, generates the commemorative image from images stored in the storage component, the commemorative image comprising one of (a) plural images corresponding to scenes in which a single user has reached respective stages corresponding to turning points in the game, (b) plural images corresponding to scenes in which each user of plural users has reached respective stages corresponding to turning points in the game, and (c) plural images corresponding to a scene in which a game has been concluded by each user of plural users, with the plural images being lined up, and effects outputting of the commemorative image via the outputting component.

6. The game device of claim 1, wherein the commemorative image-generating component effects changes in content of the commemorative image in response to whether or not the user has met predetermined conditions.

7. The game device of claim 6, wherein the predetermined conditions include whether or not the user has used a specific game among plural kinds of games provided by the game-providing component.

8. The game device of claim 6, wherein the game device is portable by the user and retrieves at least one of (a) a game device moving distance detected by a detecting component, (b) an extent of a moving range of the game device, and (c) variance in places to which the game device has moved, which are detected by a detecting component, and the predetermined conditions include whether or not an evaluation value with respect to at least one of said (a), (b) and (c) is equal to or exceeds a predetermined value.

9. The game device of claim 1, wherein the output component is a display component for displaying arbitrary images, and the commemorative image-generating component displays the commemorative image on the display component.

10. The game device of claim 1, wherein the output component is a recording component for recording arbitrary images on a recording material, and the commemorative image-generating component effects recording of the commemorative image on the recording material using the recording component.

11. A game device comprising:

a photographing component for photographing a user of a same provided by a game-providing component: and a commemorative image-generating component for effecting photographing of the user by the photographing component, detecting progress and a score in the game used by the user, generating a commemorative image by making a composite of an image representing the progress and the score and an image of the user, and outputting of the commemorative image via an outputting component, wherein the output component is a recording component for recording arbitrary images on a recording material, and the commemorative image-generating component effects recording of the commemorative image on the recording material using the recording component and the recording material is an automatic discharging and self-developing instant color film, and the recording component records the recording image on the recording material with a vacuum fluorescent print head.

12. The game device of claim 1, wherein
the output component is a communications component for transmitting and receiving arbitrary information to and from an external device, and
the commemorative image-generating component transmits image data of the commemorative image to the external device through the communications component.

13. The game device of claim 1, wherein the game-providing component, the photographing component, the commemorative image-generating component, and the output component are accommodated in a single case that the user can carry.

14. A game device comprising:
a photographing component for photographing a user of a game provided by a game-providing component; and
a processing component for identifying the user by collating a preregistered user image with an image obtained by photographing the user with the photographing component, and for effecting predetermined processing according to a current user.

15. The game device of claim 14, wherein when use of a game by an identified current user is interrupted, the processing component effects, as the predetermined processing, storage of a scene the user has reached in a storage component in correspondence with information for specifying the user, and when the game is used again by the user, the processing component effects processing to control the game-providing component, based on information stored in the storage component, so that the game is restarted from the scene the user had reached.

16. The game device of claim 14, wherein the predetermined processing is for limiting use of the game device based on preset use limitation information.

17. The game device of claim 16, wherein the use limitation information includes a user, a date, and a number of times use is permitted or a place at which use is prohibited, with the use limitation information being set by a guardian.

18. A game device comprising:
a photographing component for photographing a user of a game provided by a game-providing component;
an image-transmitting component for transmitting, through a communications component, an image of the user photographed with the photographing component to another game device when the game-providing component provides the user with a fighting game in which the user fights against another user of the another game device by communicating with the another game device through the communications component, with which arbitrary information can be transmitted and received to and from the another game device; and
a display control component for displaying the image, which has received from the another game device through the communications component, of the user of the another game device on a display component for displaying arbitrary images.

19. The game device of claim 18, wherein the another game device is any one of the game device the user is using, a remote control toy, and an autonomously moving toy.

20. The game device of claim 1, wherein the outputting component is a printing component, and the commemorative image-generating component effects printing of the commemorative image on the recording material using the printing component.

21. A game device comprising:
a photographing component for photographing a user of a game provided by a game-providing component: and
a commemorative image-generating component for effecting photographing of the user by the photographing component, detecting progress and a score in the game used by the user, generating a commemorative image by making a composite of an image representing the progress and the score and an image of the user, and outputting of the commemorative image via an outputting component, wherein the outputting component is a printing component, and the commemorative image-generating component effects printing of the commemorative image on the recording material using the printing component and the printing component is built-in to the game device.

22. A game device comprising:
a photographing component for photographing a user of a game provided by a game-providing component: and
a commemorative image-generating component for effecting photographing of the user by the pbotographing component, detecting progress and a score in the game used by the user, generating a commemorative image by making a composite of an image representing the progress and the score and an image of the user, and outputting of the commemorative image via an outputting component, wherein the outputting component is a printing component, and the commemorative image-generating component effects printing of the commemorative image on the recording material using the printing component and the printing component includes a printer and a cartridge having a plurality of recording materials, and wherein the gaming device is a hand-held device.

23. The game device of claim 22, wherein the printing component is built-in to the game device.

24. The game device of claim 2, wherein the stage is a predetermined stage of a plurality of stages.

25. The game device of claim 3, wherein the stage is a predetermined stage of a plurality of stages.

26. The game device of claim 2, wherein the stage is identified by at least one of a number of cleared screens, a score, a time, a medal, a specific character.

27. The game device of claim 3, wherein the stage is identified by at least one of a number of cleared screens, a score, a time, a medal, a specific character.

28. A game device comprising:
a photographing component for photographing a user of a game provided by a game-providing component: and
a commemorative image-generating component for effecting photographing of the user by the photographing component, detecting progress and a score in the game used by the user, generating a commemorative image by making a composite of an image representing the progress and the score and an image of the user, and outputting of the commemorative image via an outputting component, wherein
the commemorative image-generating component effects changes in content of the commemorative image in response to whether or not the user has met predetermined conditions,
the game device is portable by the user and retrieves at least one of (a) a game device moving distance detected by a detecting component, (b) an extent of a moving range of the game device, and (c) variance in places to which the game device has moved, which are detected by a detecting component, the predetermined conditions include whether or not an evaluation value with respect to at least one of said (a), (b) and (c) is equal to or exceeds a predetermined value, the game device is portable by the user and retrieves (a) information regarding variance in places to which the game device has moved and at least one of (b) a game device moving distance detected by a detecting component and (c) an extent of a moving range of the game device, which are detected by a detecting component, and the predetermined conditions include whether or not an evaluation value with respect to at least one of said (a), (b) and (c) is equal to or exceeds a predetermined value.

29. A game device comprising:

a photographing component for photographing a user of a game provided by a game-providing component;

a commemorative image-generating component for effecting photographing of the user by the photographing component, detecting progress and a score in the game used by the user, generating a commemorative image by making a composite of an image representing the progress and the score and an image of the user, and outputting of the commemorative image via an outputting component;

an image-transmitting component for transmitting, through a communications component, an image of the user photographed with the photographing component to another game device when the game-providing component provides the user with a fighting game in which the user fights against another user of the other game device by communicating with the other game device through the communications component, with which arbitrary information can be transmitted and received to and from the other game device; and a display control component for displaying an image of a user of the other game device, which has been received from the other game device through the communications component, on a display component for displaying arbitrary images.

* * * * *